United States Patent
Lee et al.

(10) Patent No.: US 9,158,500 B2
(45) Date of Patent: Oct. 13, 2015

(54) DEVICE AND METHOD FOR PROCESSING DATA INCLUDING GENERATING A PSEUDO RANDOM NUMBER SEQUENCE

(75) Inventors: Ki Jun Lee, Seoul (KR); Jun Jin Kong, Yongin-si (KR); Yong June Kim, Suwon-si (KR); Jae Hong Kim, Seoul (KR); Hong Rak Son, Anyang-si (KR); Jung Soo Chung, Seoul (KR); Seong Hyeong Choi, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 383 days.

(21) Appl. No.: 13/537,297

(22) Filed: Jun. 29, 2012

(65) Prior Publication Data

US 2013/0007081 A1    Jan. 3, 2013

(30) Foreign Application Priority Data

Jun. 30, 2011    (KR) .......................... 10-2011-0065195

(51) Int. Cl.
*G06F 7/58*    (2006.01)
(52) U.S. Cl.
CPC .......... *G06F 7/584* (2013.01); *G06F 2207/583* (2013.01)
(58) Field of Classification Search
USPC ................................................. 708/250–256
See application file for complete search history.

(56) References Cited

U.S. PATENT DOCUMENTS

| | | | | |
|---|---|---|---|---|
| 4,748,576 A * | 5/1988 | Beker et al. | | 708/250 |
| 4,748,585 A * | 5/1988 | Chiarulli et al. | | 712/15 |
| 5,931,968 A * | 8/1999 | Gray | | 714/806 |
| 6,339,781 B1 * | 1/2002 | Sasaki | | 708/252 |
| 6,834,291 B1 * | 12/2004 | Pugh et al. | | 708/252 |
| 7,426,528 B2 * | 9/2008 | Denk | | 708/252 |
| 7,479,837 B2 * | 1/2009 | Muecke et al. | | 331/78 |
| 7,979,482 B2 * | 7/2011 | Gammel et al. | | 708/252 |
| 2002/0009123 A1 * | 1/2002 | Medlock | | 375/130 |
| 2004/0090907 A1 * | 5/2004 | An | | 370/208 |
| 2005/0147243 A1 * | 7/2005 | Baek | | 380/28 |
| 2005/0185796 A1 * | 8/2005 | Lablans | | 380/268 |
| 2009/0172266 A1 * | 7/2009 | Kimura | | 711/103 |
| 2009/0292751 A1 * | 11/2009 | Schneider | | 708/250 |
| 2011/0119432 A1 * | 5/2011 | Yoon | | 711/103 |

OTHER PUBLICATIONS

ML Krieg, HS Mills, and JD Rickett, Non-Repetitive Random Sequencer, Nov. 1, 1985, IBM TDB 11-85, pp. 2303-2304 (pp. 2-3).*
Mark Goresky and Andrew M. Klapper, Fibonacci and Galois Representations of Feedback-With-Carry Shift Registers, Nov. 2002, IEEE Transactions on Information Theory, vol. 48, No. 11, pp. 2826-2836.*

* cited by examiner

*Primary Examiner* — Chat Do
*Assistant Examiner* — Calvin M Brien
(74) *Attorney, Agent, or Firm* — Volentine & Whitt, PLLC

(57) ABSTRACT

A data processing device which includes a conversion circuit and a pseudo random number generator including a series connection of plural shift registers. The conversion circuit receives a pseudo random number sequence from an output of one of the plural shift registers excluding a last shift register of the series connection, and converts first data to second data using the received pseudo random number sequence.

21 Claims, 24 Drawing Sheets

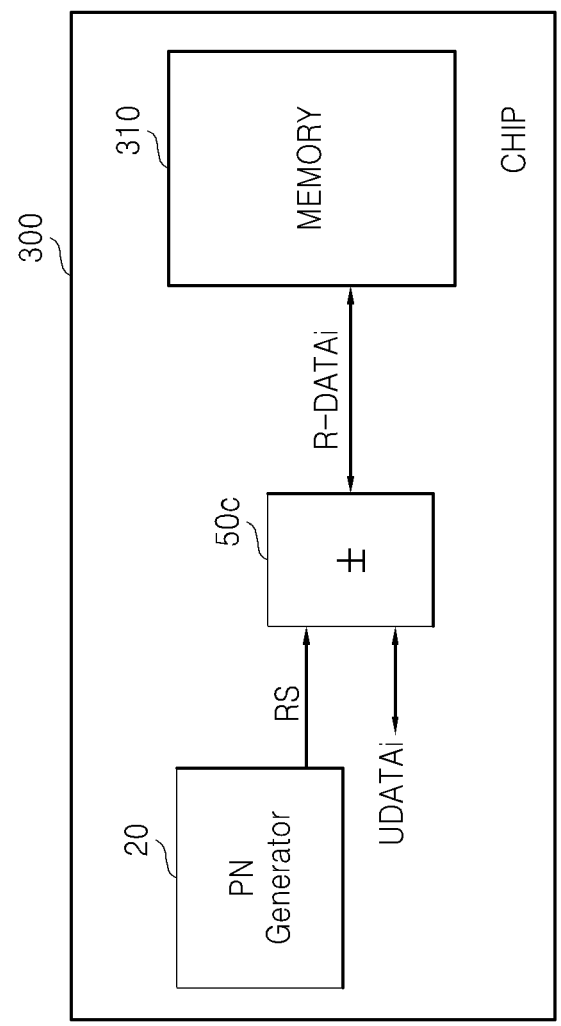

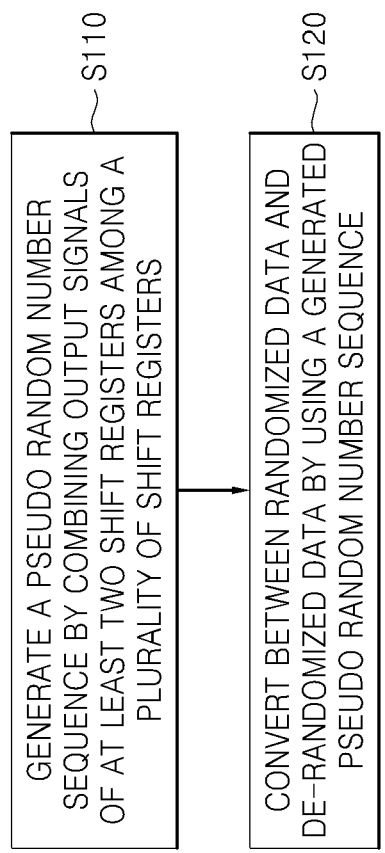

DEVICE AND METHOD FOR PROCESSING DATA INCLUDING GENERATING A PSEUDO RANDOM NUMBER SEQUENCE

CROSS-REFERENCE TO RELATED APPLICATION

A claim of priority under 35 U.S.C. §119(a) is made to Korean Patent Application No. 10-2011-0065195 filed on Jun. 30, 2011, the disclosure of which is hereby incorporated by reference in its entirety.

BACKGROUND

Embodiments of the present inventive concept relate to data processing technology, and more particularly, to a data processing device configured to generate a pseudo random number sequence and to a data processing method in which a pseudo random number sequence is generated.

Pseudo random number sequences are utilized in a wide variety of electronic/computer systems which process data, including communication systems and data storage systems. Typically, a pseudo random number sequence is generated using the output of a linear feedback shift register (LFSR). The sequence generated is dependent upon a state or "seed" of the LFSR. For example, a seed may dictate an operational feedback tap configuration of the LFSR. Different pseudo random number sequences can be generated by initializing the LFSR with difference seeds.

One use of pseudo random number sequences is the randomization of transmitted or stored data. Here, a randomizer device converts non-random (original) data into randomized data (for transmission or storage) using a pseudo random number sequence generated by the LFSR, and a de-randomizer device converts the randomized data back to the original non-random data using the same pseudo random number sequence generated by the LFSR.

SUMMARY

An embodiment of the inventive concepts is directed to a data processing device which includes a conversion circuit and a pseudo random number generator including a series connection of plural shift registers. The conversion circuit receives a pseudo random number sequence from an output of one of the plural shift registers excluding a last shift register of the series connection, and converts first data to second data using the received pseudo random number sequence.

Another embodiment of the inventive concepts is directed to a data processing device which includes a pseudo random number generator, a combination circuit, and a conversion circuit. The pseudo random number generator includes a series connection of plural shift registers. The combination circuit combines output signals of at least two shift registers among the plural shift registers. The conversion circuit receives a pseudo random number sequence from an output from the combination circuit, and converts first data to second data using the received pseudo random number sequence.

Yet another embodiment of the inventive concepts is directed to a method for operating a data processing device which includes generating a pseudo random number sequence using a series connection of plural shift registers, the pseudo random number sequence being output from one of the plural shift registers excluding a last shift register of the series connection. The method further includes converting first data to second data using the pseudo random number sequence.

Still another embodiment of the inventive concepts is directed to a method for operating a data processing device which includes generating a pseudo random number sequence by combining output signals of at least two shift registers among series connected plural shift registers, and converting first data to second data using the pseudo random number sequence.

Another embodiment of the inventive concepts is directed to a data processing device which includes a memory, a pseudo random number generator, a randomizer and a de-randomizer. The pseudo random number generator includes a series connection of plural shift registers. The randomizer randomizes first data to obtain random second data for storage in the memory, where the randomizer randomizes the first data using a pseudo random number sequence output from one of the plural shift registers excluding a last shift register of the series connection. The de-randomizer de-randomizes third data read from the memory to obtain de-randomized fourth data using the pseudo random number sequence.

Still another embodiment of the inventive concepts is directed to a data processing device which includes a memory, a pseudo random number generator, a combination circuit, a randomizer and a de-randomizer. The pseudo random number generator includes a series connection of plural shift registers. The combination circuit combines output signals of at least two shift registers among the plurality of shift registers. The randomizer randomizes first data to obtain random second data for storage in the memory, where the randomizer randomizes the first data using a pseudo random number sequence output from the combination circuit. The de-randomizer de-randomizes third data read from the memory to obtain de-randomized fourth data using the pseudo random number sequence.

BRIEF DESCRIPTION OF THE DRAWINGS

These and/or other aspects and advantages of the present general inventive concept will become readily apparent from the description of the embodiments that follows, taken in conjunction with the accompanying drawings of which:

FIG. 16A illustrates an example embodiment in which a pseudo random number generator and a conversion circuit according to an example embodiment of the inventive concepts are embodied in a data processing device;

FIG. 23 is a flowchart for use in describing a method of operating a data processing device according to another example embodiment of the inventive concepts.

DETAILED DESCRIPTION OF THE PREFERRED EMBODIMENTS

Figure 1:
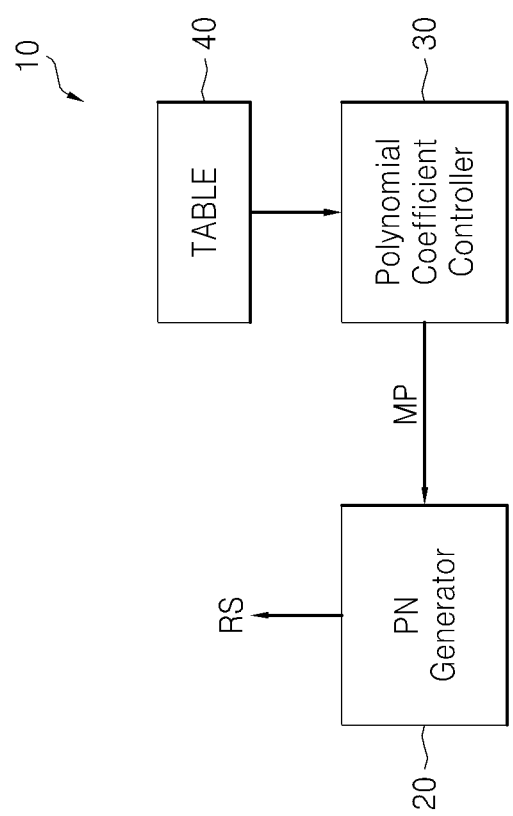
FIG. 1 is a block diagram of a data processing device including a pseudo random number generator according to an example embodiment of the inventive concepts.

Exemplary embodiments now will be described more fully hereinafter with reference to the accompanying drawings. The exemplary embodiments may, however, be embodied in many different forms and should not be construed as limited to the embodiments set forth herein. Rather, these embodiments are provided so that this disclosure will be thorough and complete. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing device according to an example embodiment of the inventive concepts. Referring to FIG. 1, the data processing device 10 includes a pseudo random number generator 20, a polynomial coefficient controller 30 and a table 40. The table 40 may, for example, be constituted by a non-volatile memory.

The data processing device 10, which is not limited to any particular technology currently-known or being-developed, may also include at least one of a randomizer and a de-randomizer (not shown in FIG. 1). As examples, the data processing device 10 may be embodied in a personal computer (PC), a tablet PC, a laptop computer, a memory card, a smart card, a mobile phone, a smart phone, a navigator for vehicles, a data server, a hard disk drive (HDD), a solid state drive (SSD) and a network-attached storage (NAS).

In the example of this embodiment, the pseudo random number generator 20 generates various pseudo random number sequences RS based on a parameter MP from the polynomial coefficient controller. Also, depending upon the configuration of elements included in the pseudo random number generator 20, the pseudo random number generator 20 may generate a linear pseudo random number sequence RS or a non-linear pseudo random number sequence RS.

The polynomial coefficient controller 30 transmits the parameter MP and may be embodied as an electronic circuit, as logic devices, as software code or as a combination of any of these. The parameter MP is set with reference to the table 40, and determines an operating state of the pseudo random number generator 20, e.g., by specifying a feedback polynomial or a characteristic polynomial of the pseudo random number generator 20. In this case, the pseudo random number sequence RS is determined by the feedback polynomial or the characteristic polynomial. The parameter MP may be data that is itself stored in the table 40 or data that is processed by the polynomial coefficient controller 30.

In an example embodiment, the table 40 stores data utilized for a memory device access operation, e.g., a read operation, a write operation, a program operation or an erase operation. The memory device being accessed may be a volatile memory device or a non-volatile memory device. For example, parameters MP may be stored in the table 40 corresponding to at least one of word line addresses and bit line addresses of memory cell being accessed. As other examples, when the memory being accessed includes a plurality of blocks and each of the plurality of blocks is a flash memory, e.g., a NAND flash memory, which includes a plurality of pages, parameters MP may correspond to at least one of block addresses, word line addresses, bit line addresses, page addresses, memory chip IDs indicating an identification (ID) of the memory, a program count and an erase count. The parameter MP may include one-bit or multiple bits.

Figure 2:
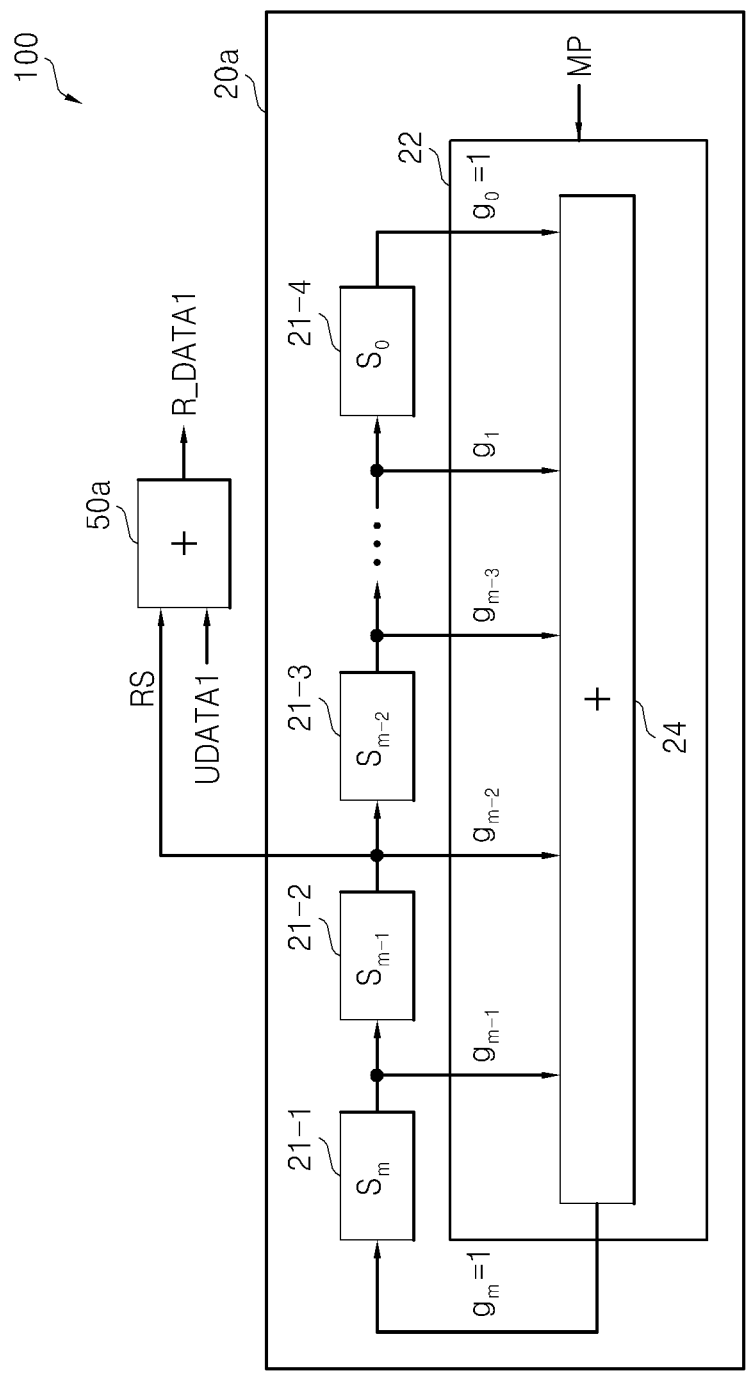
FIG. 2 illustrates an example embodiment of a randomizer including a pseudo random number generator illustrated in FIG. 1.

FIG. 2 illustrates an example embodiment of a randomizer including an example of the pseudo random number generator 20 illustrated in FIG. 1. Referring to FIGS. 1 and 2, the randomizer 100 includes a pseudo random number generator 20a and a conversion circuit 50a.

A pseudo random number generator 20a, which is an example of the pseudo random number generator 20 of FIG. 1, includes a plurality of shift registers 21-1 to 21-4 connected in series (cascade), and a feedback polynomial determination circuit 22.

An output terminal of one of the plurality of shift registers 21-1 to 21-3 excluding the last shift register 21-4 is coupled to a conversion circuit 50a through an electrical circuit (wire) pattern. In the example of FIG. 2, the output terminal of the shift register 21-2 is coupled as an input to the conversion circuit 50a.

The conversion circuit 50a randomizes input data to output random data R_DATA1. The input data may be user data UDATA1 (for example, original data). The randomization is achieved using a pseudo random number sequence RS output from the output terminal of the one (e.g., 21-2) of the shift registers 21-1 to 21-3 excluding the last shift register 21-4. Here, a pseudo random number sequence RS generated by the pseudo random number generator 20a may be a binary sequence or a non-binary sequence.

The conversion circuit 50a may, for example, be configured to execute modulo addition on the pseudo random number sequence RS and first data UDATA1, and output randomized second data R_DATA as a result. In example embodiments, the conversion circuit 50a is embodied as a Boolean logic gate circuit, e.g., a AND gate, an OR gate, a NOT gate, an exclusive-OR (XOR) gate, an exclusive-NOR (XNOR) gate or a combination of these.

The randomized data R_DATA1 output from the conversion circuit 50a may be written or programmed in a memory, e.g., a memory 310 illustrated in FIGS. 16A to 21 (described later).

In this case, the memory may include a memory cell array including a plurality of word lines, a plurality of bit lines and a plurality of memory cells each connected between each of the plurality of word lines and each of the plurality of bit lines, and a write circuit/read circuit for writing/reading the randomized data R_DATA1 to/from the memory cell array. That is, the randomized data R_DATA1 may be written in the memory cell array through the write circuit. The plurality of memory cells, which may each store one or multiple bits of data, is not limited by technology, whether currently existing or in development, and may be volatile and/or non-volatile. Examples of currently existing volatile memory cell technologies include a dynamic random access memory (DRAM), a static random access memory (SRAM), a thyristor RAM (T-RAM), a zero capacitor RAM (Z-RAM) or a Twin Transistor RAM (TTRAM). Examples of currently existing non-volatile memory technologies include an Electrically Erasable Programmable Read-Only Memory (EEPROM), a flash memory, a Magnetic RAM (MRAM), a Spin-Transfer Torque MRAM, a Conductive bridging RAM (CBRAM), a Ferroelectric RAM (FeRAM), a Phase change RAM (PRAM), a Resistive RAM (RRAM or ReRAM), a Nanotube RRAM, a Polymer RAM (PoRAM), a Nano floating Gate Memory (NFGM), a holographic memory, a Molecular Electronics Memory Device or an Insulator Resistance Change Memory.

In an example embodiment, the feedback polynomial determination circuit 22 determines a feedback polynomial or a characteristic polynomial of the pseudo random number generator 20a by using a parameter MP necessary for accessing a memory, e.g., the memory 310 of FIGS. 16A to 21. For example, when the feedback polynomial determination circuit 22 includes a logic gate array 24 including a plurality of Boolean logic gates, the logic gate array 24 determines a logic output, which is feedback to a first shift register 21-1, by using the parameter MP.

The character gi ($0 \leq i \leq m$) illustrated in FIG. 2 denotes a feedback weight, a feedback tap or a feedback coefficient wherein '0' denotes no-connection and a number more than '1' denotes feedback.

Accordingly, the gi ($0 \leq i \leq m$) of the feedback polynomial determination circuit 22 or a logic output of the logic gate array 24 may be adjusted or determined based on a parameter MP.

A conventional linear feedback shift register (LFSR) outputs bits output from a last shift register among a plurality of shift registers connected in series as a pseudo random number sequence. In contrast, the pseudo random number generator 20a illustrated in FIG. 2 according to an example embodiment of the inventive concepts outputs bits, which are output from one of a plurality of shift registers 21-1 to 21-4 excluding last shift register 21-4, as a pseudo random number sequence RS. Additionally, the pseudo random number sequence RS is determined based on a parameter MP. As such, randomness of the pseudo random number sequence RS is increased.

Figure 3:
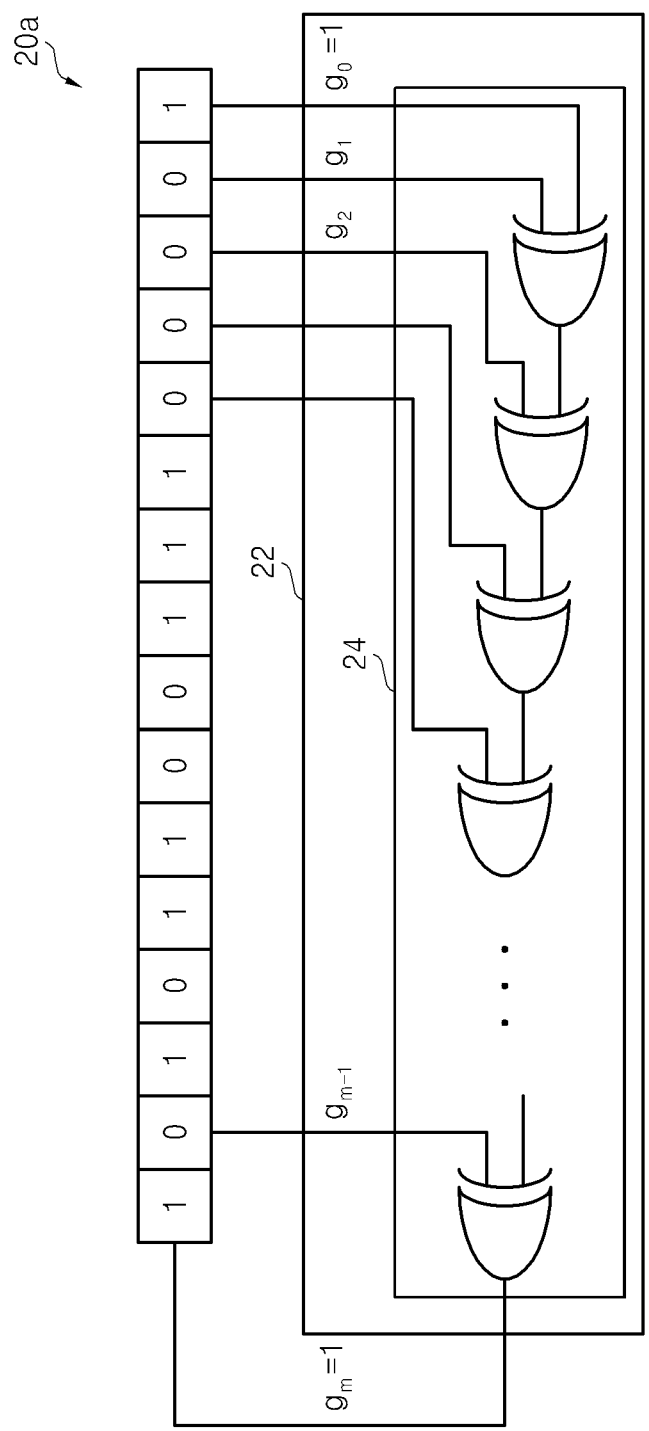
FIG. 3 illustrates an example of the pseudo random number generator illustrated in FIG. 2.

FIG. 3 illustrates an example of the pseudo random number generator illustrated in FIG. 2. The pseudo random number generator 20a illustrated in FIG. 3 is embodied in a 16-bit Fibonacci LFSR and a pseudo random sequence RS, which is output from one of 15 shift registers where a last shift register is excluded from 16 shift registers, is transmitted to the conversion circuit 50a illustrated in FIG. 2.

According to an example embodiment, the pseudo random number generator 20a may be embodied in a Galois LFSR. Here, a pseudo random sequence, which is output from any one of a plurality of shift registers excluding a last shift register included in the Galois LFSR, may be transmitted to the conversion circuit 50a illustrated in FIG. 2.

When the pseudo random number generator 20a is embodied in the Galois LFSR, a logic output of the logic gate array 24 may be feedback to an input of one of a plurality of shift registers included in the Galois LFSR.

Figure 5:
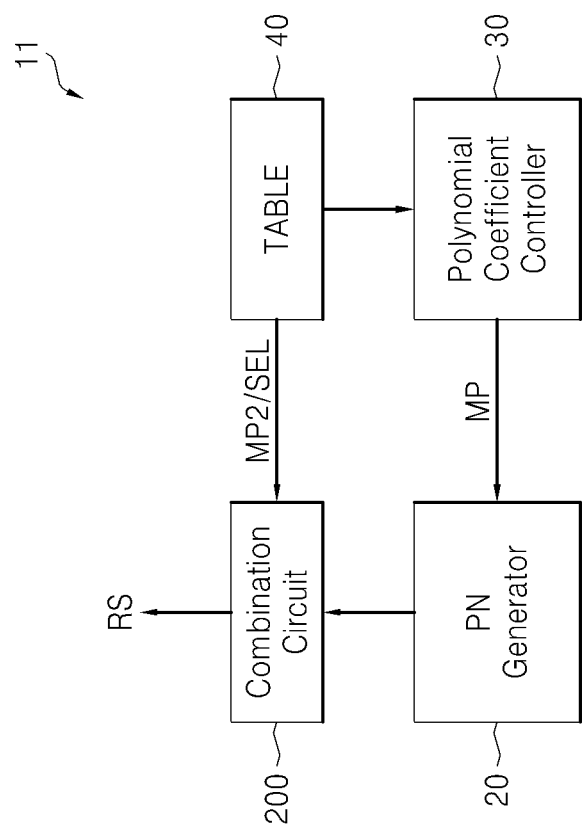
FIG. 5 is a block diagram of the data processing device including a pseudo random number generator according to another example embodiment of the inventive concepts.

Accordingly, the pseudo random number generator 20 of FIG. 1 or 5 of the inventive concepts may be embodied in a Fibonacci linear feedback pseudo random number generator, a Galois linear feedback pseudo random number generator, a Fibonacci non-linear feedback pseudo random number generator or a Galois non-linear feedback pseudo random number generator.

The pseudo random number generator 20a of FIG. 3 embodied as a binary pseudo random number generator is no more than an example for explaining that the feedback polynomial determination circuit 22 of FIG. 2 may determine a feedback polynomial or a characteristics polynomial by using a parameter MP. Accordingly, when the logic gate array 24 includes a plurality of XOR gates and each gi ($0 \leq i \leq m$) is determined to be 1 or 0 based on a parameter MP, a logic output of the logic gate array 24 is determined accordingly.

Figure 4:
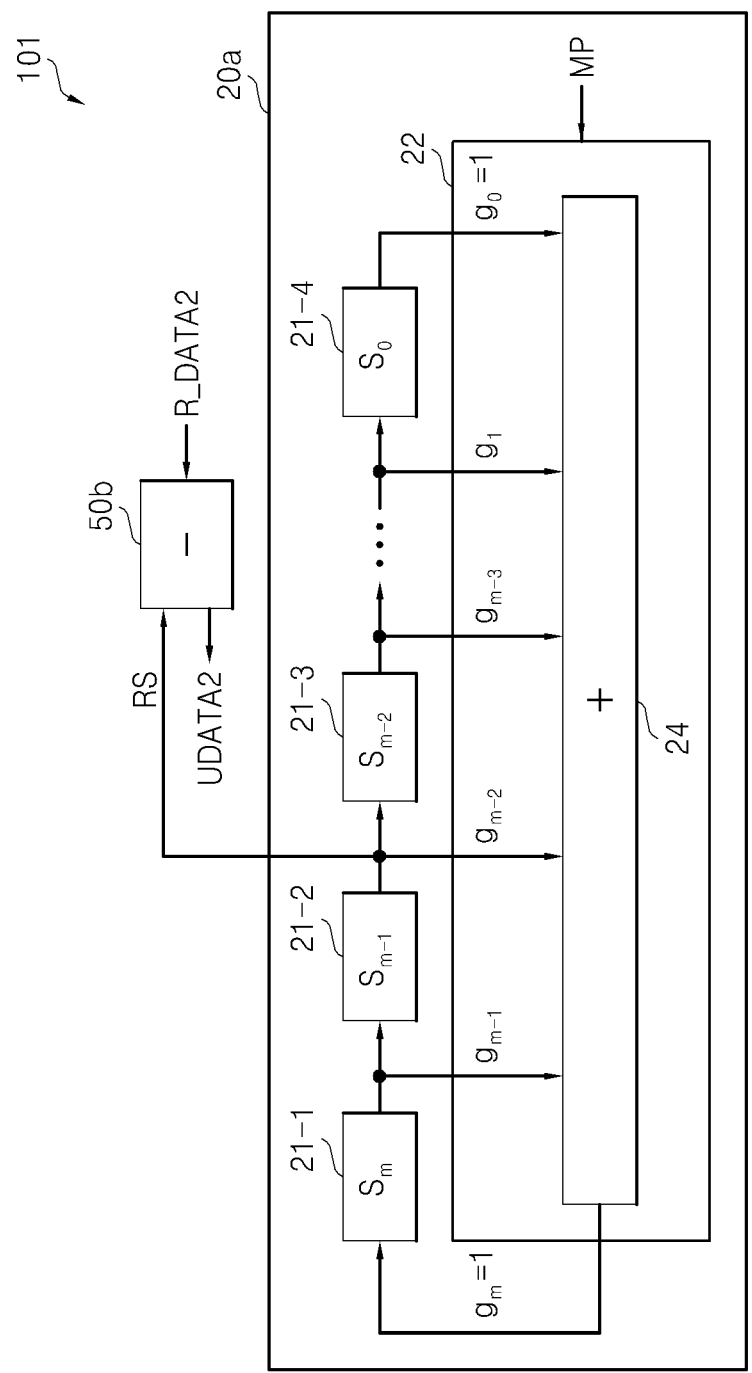
FIG. 4 illustrates an example embodiment of a de-randomizer including the pseudo random number generator illustrated in FIG. 1.

FIG. 4 illustrates an example embodiment of a de-randomizer including the pseudo random number generator illustrated in FIG. 1. It will be apparent that the de-randomizer of FIG. 4 is substantially the same in structure as the randomizer of FIG. 2. That is, the conversion circuit 50b generates data UDATA2 by performing modulo subtraction of a pseudo random number sequence RS from randomized data R_DATA2. Otherwise, the structure is the same as that of FIG. 2. It is noted that when a pseudo random number sequence RS is a binary sequence and the conversion circuit 50a or 50b is embodied in a XOR gate, an operation result of modulo-2 addition is equal to an operation result of modulo-2 subtraction.

According to an example embodiment, the conversion circuit 50b may be embodied as a Boolean logic gate circuit, e.g., an AND gate, an OR gate, a NOT gate, an exclusive-or (XOR) gate, an exclusive-nor (XNOR) gate or a combination of these.

As shown in FIG. 4, the conversion circuit 50b of the de-randomizer 101 de-randomizes randomized data R_DATA2 to data UDATA2 by using a pseudo random number sequence RS output from one (e.g., shift register 21-2) of the rest shift registers 21-1 to 21-3 excluding the last shift register 21-4.

Here, the pseudo random number sequence RS is determined based on a feedback polynomial, which is determined by using a parameter MP necessary for accessing a memory (e.g., memory 310 of FIGS. 16A to 21) storing the data R_DATA2.

Table 1 is presented as an example illustrating that a feedback polynomial may be determined based on a parameter MP including a plurality of bits.

TABLE 1

| Bits | Feedback polynomial | Period |
|---|---|---|
| n | — | $2^n - 1$ |
| 2 | $x^2 + x + 1$ | 3 |
| 3 | $x^3 + x^2 + 1$ | 7 |
| 4 | $x^4 + x^3 + 1$ | 15 |
| 5 | $x^5 + x^3 + 1$ | 31 |
| 6 | $x^6 + x^5 + 1$ | 63 |

FIG. 5 is a block diagram of the data processing device according to another example embodiment of the inventive concepts.

The configuration of FIG. 5 is similar to that of FIG. 1, except for the provision of a combination circuit 200 for selecting and combining output signals of at least two shift registers among a plurality of shift registers included in the pseudo random number generator 20 and outputting a combined signal as a pseudo random number sequence RS.

Here, the combination circuit 200 may execute a selection operation for selecting output signals of at least two shift registers among a plurality of shift registers included in the pseudo random number generator 20 and/or a combination operation of output signals of the selected at least two shift registers in response to a selection signal SEL or a second parameter MP2 output from a table 40.

The combination operation may be modulo-P addition, modulo-P subtraction or modulo-P multiplication, where P is a natural number of more than 2.

For example, when a pseudo random number sequence RS is a binary sequence, the combination circuit 200 may perform modulo-2 addition, modulo-2 subtraction or modulo-2 multiplication according to a second parameter MP2 including a plurality of bits. Moreover, when a pseudo random number sequence is a P-ary sequence, the combination circuit 200 may perform modulo-P addition, modulo-P subtraction or modulo-P multiplication according to the second parameter MP2.

Figure 6:
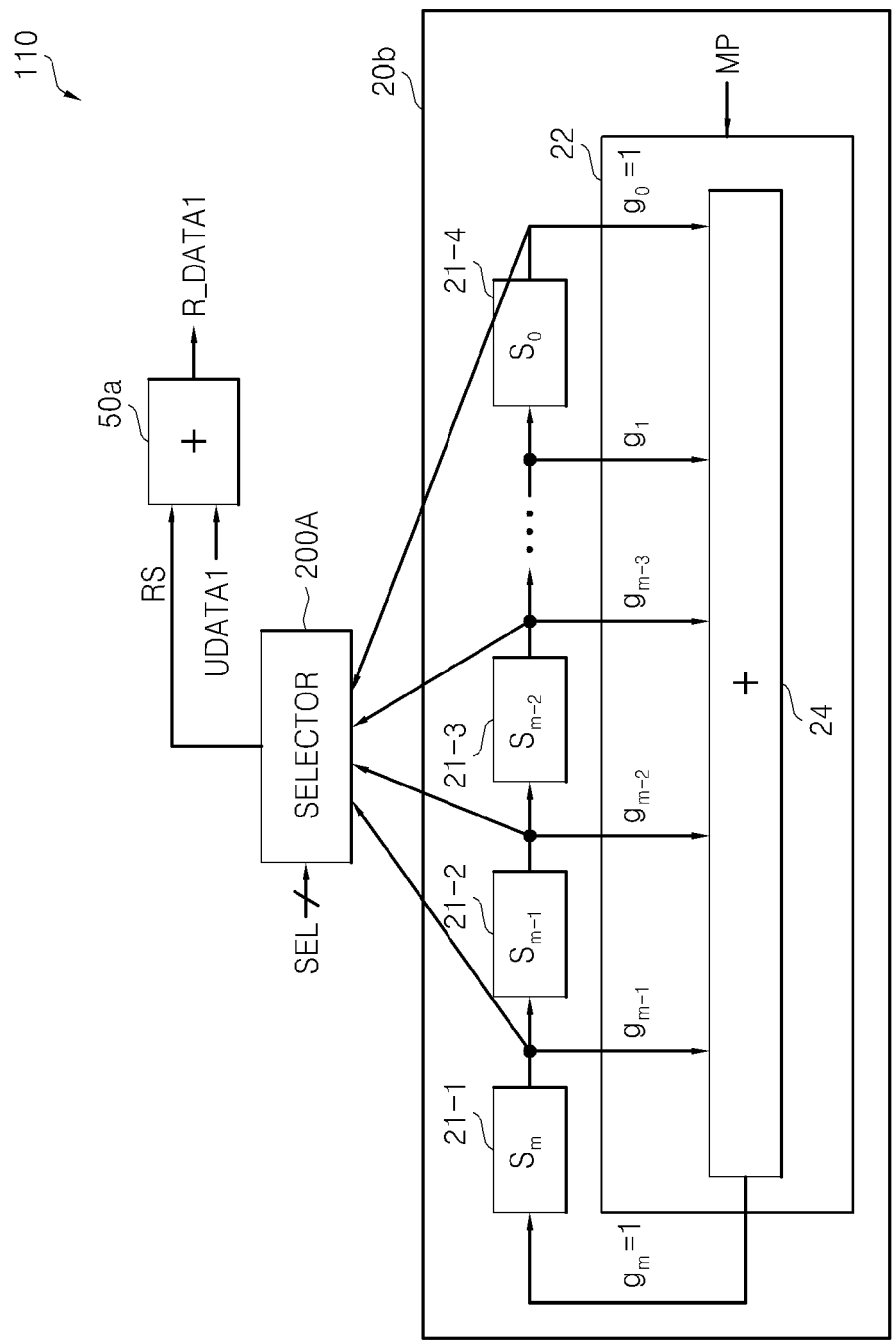
FIG. 6 illustrates an example embodiment of the randomizer including the pseudo random number generator illustrated in FIG. 5.

FIG. 6 illustrates an example embodiment of a randomizer including a pseudo random number generator illustrated in FIG. 5. Referring to FIG. 6, the randomizer 110 includes a pseudo random number generator 20b embodied as an example embodiment of the pseudo random number generator 20 illustrated in FIG. 5, a selector 200A embodied as an example of the combination circuit 200 illustrated in FIG. 5, and a conversion circuit 50a.

The selector 200A receives an output signal output from each of a plurality of shift registers 21-1 to 21-4 included in the pseudo random number generator 20b, selects an output signal of one of the plurality of shift registers 21-1 to 21-4 excluding a last shift register 21-4 according to a selection signal SEL, and outputs a selected output signal to the conversion circuit 50a as a pseudo random number sequence RS.

The parameter MP may be used as a selection signal SEL. The selection signal SEL may be one-bit or multiple bits, and the selector 200A may be embodied in a multiplexer.

The conversion circuit 50a which may perform modulo addition randomizes data UDATA1 to data R_DATA1 according to a pseudo random number sequence RS output from the selector 200A.

Figure 7:
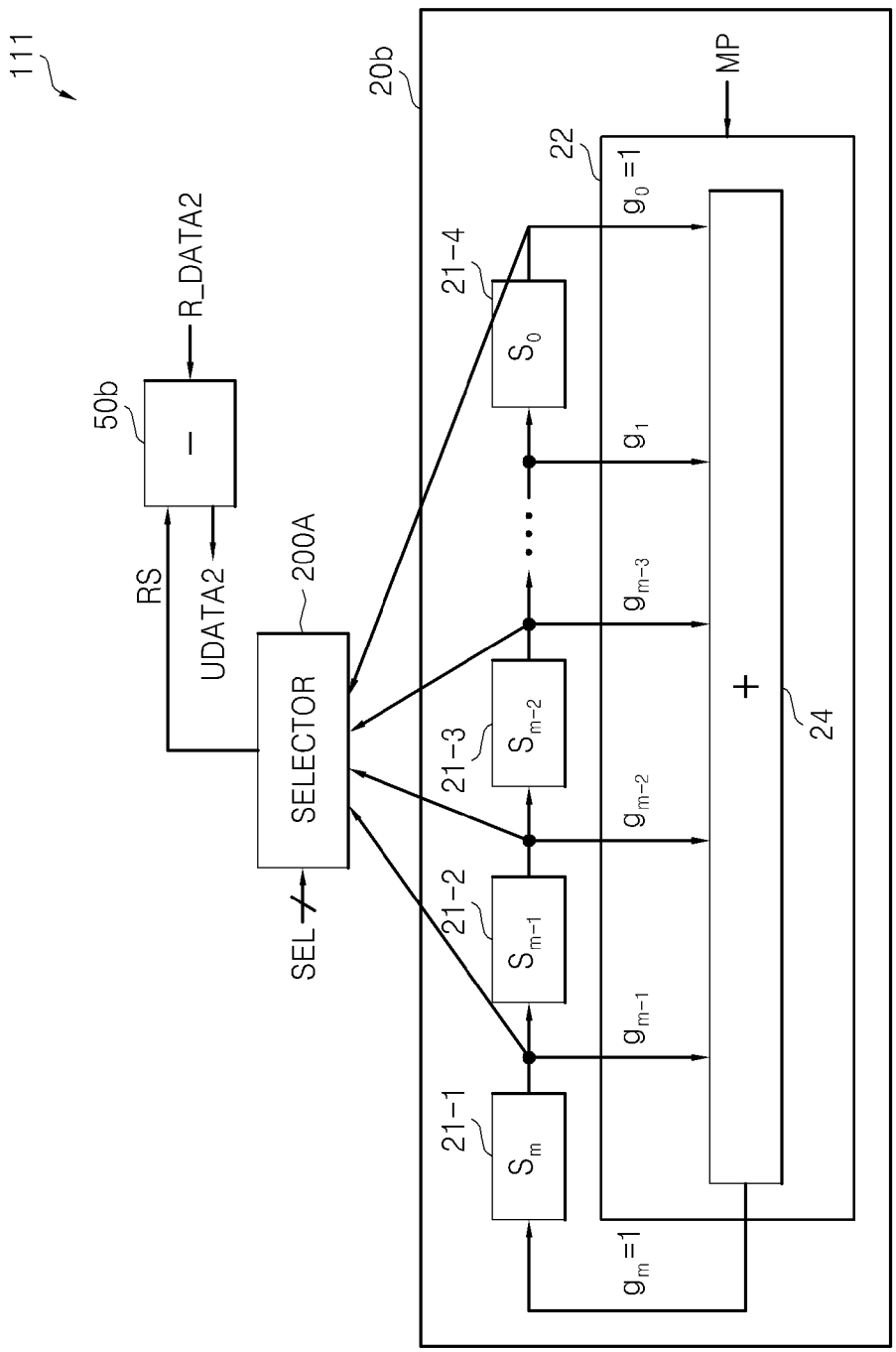
FIG. 7 illustrates an example embodiment of the de-randomizer including the pseudo random number generator illustrated in FIG. 5.

FIG. 7 illustrates an example embodiment of a de-randomizer including a pseudo random number generator illustrated in FIG. 5. Here, the conversion circuit 50b generates data UDATA2 by performing modulo subtraction of a pseudo random number sequence RS from randomized data R_DATA2. Otherwise, the structure of the randomizer 110 illustrated in FIG. 6 is the same as that of a de-randomizer 111 illustrated in FIG. 7.

The conversion circuit 50b de-randomizes the randomized data R_DATA2 to data UDATA2 according to a pseudo random number sequence RS output from the selector 200A. As described above, the pseudo random number sequence RS is determined according to an output of a selected register among a plurality of shift registers 21-1 to 21-4 excluding the last shift register 21-4 is selected.

Figure 8:
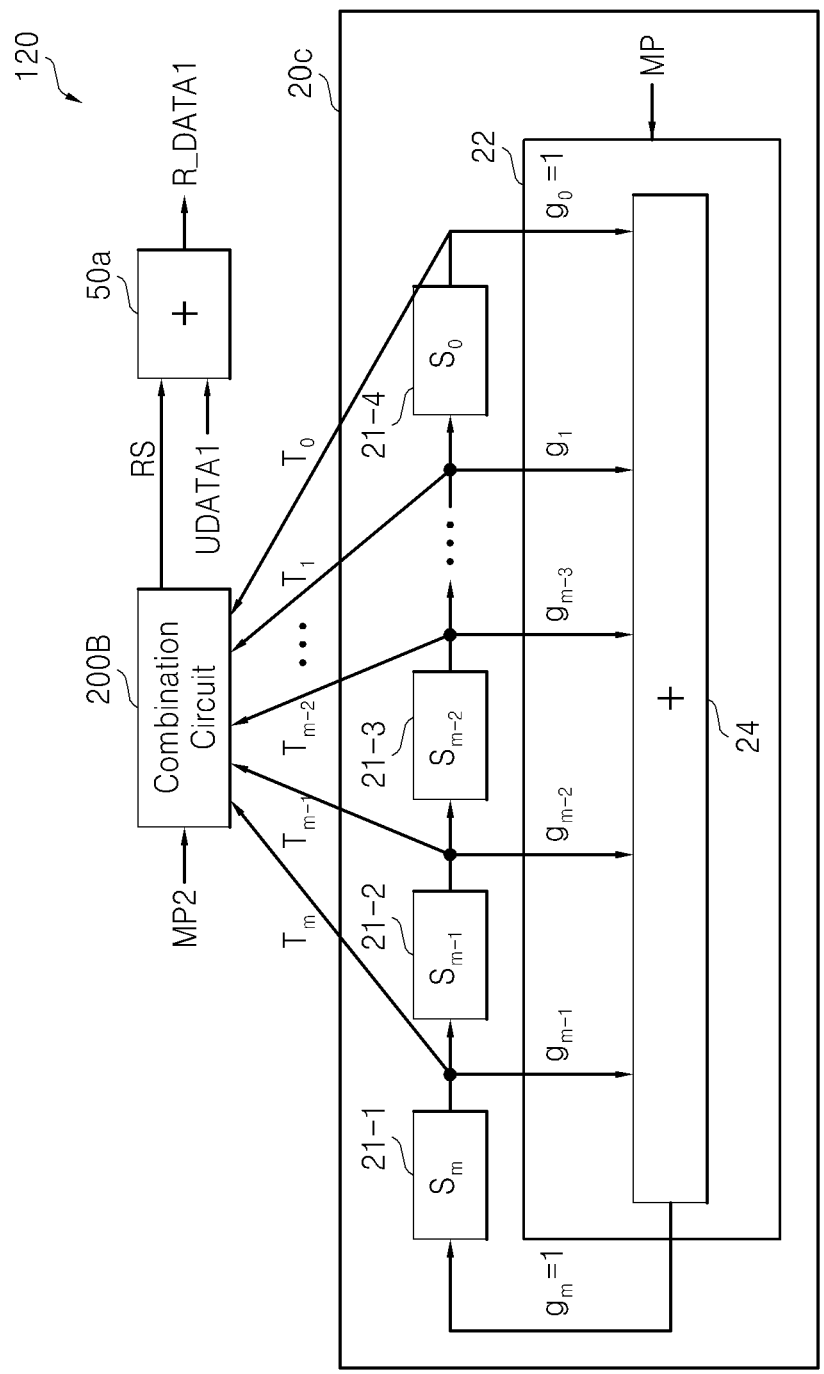
FIG. 8 illustrates another example embodiment of the randomizer including the pseudo random number generator illustrated in FIG. 5.

FIG. 8 illustrates another example embodiment of a randomizer including the pseudo random number generator illustrated in FIG. 5. Referring to FIG. 8, a randomizer 120 includes a pseudo random number generator 20c embodied as another example embodiment of the pseudo random number generator 20 of FIG. 5, a combination circuit 200B embodied as another example of the combination circuit 200 of FIG. 5, and the conversion circuit 50a.

A combination circuit 200B may receive an output signal output from each of a plurality of shift registers 21-1 to 21-4 included in the pseudo random number generator 20c, and execute a selection operation for selecting output signals of at least two shift registers among the plurality of shift registers 21-1 to 21-4 and/or a combination method of output signals of the selected at least two shift registers, based on a second parameter MP2.

In FIG. 8 and subsequent drawings, feedforward taps (Tj, $0 \leq j \leq m$) denotes weights or a coefficients which may be input to the combination circuit 200, in contrast to gi ($0 \leq i \leq m$).

The combination method selected based on the second parameter MP2 may be modulo-P addition or modulo-P multiplication, where P is a natural number of more than 2. The combination circuit 200B outputs a pseudo random number sequence RS determined based on the selection operation and/or the combination method.

For example, when a second parameter MP2 is 5 bits, the pseudo random number generator 20 includes four shift registers, a most significant bit (MSB) of the second parameter MP2 selects modulo-P addition (e.g., in case MSB is 1) or modulo-P multiplication (e.g., in case MSB is 0), a pseudo random number sequence RS is a binary sequence and the second parameter MP2 is 11001, a combination circuit 200B may perform modulo-2 addition on an output of a first shift register and an output of a last shift register among four shift registers.

In addition, under the same conditions, when the second parameter MP2 is 01110, the combination circuit 200B may perform modulo-2 multiplication on outputs of a first shift register to a third shift register among the four shift registers.

According to an example embodiment, the second parameter MP2 may be the same parameter as the parameter MP or another parameter different from the parameter MP. However, the second parameter MP2 may be a parameter necessary for an access operation, e.g., a read operation, a write operation or an erase operation, for a memory, e.g., a volatile memory or a non-volatile memory.

The conversion circuit 50a randomizes data UDATA1 to data R_DATA1 based on a pseudo random number sequence RS output from the combination circuit 200B.

Figure 9:
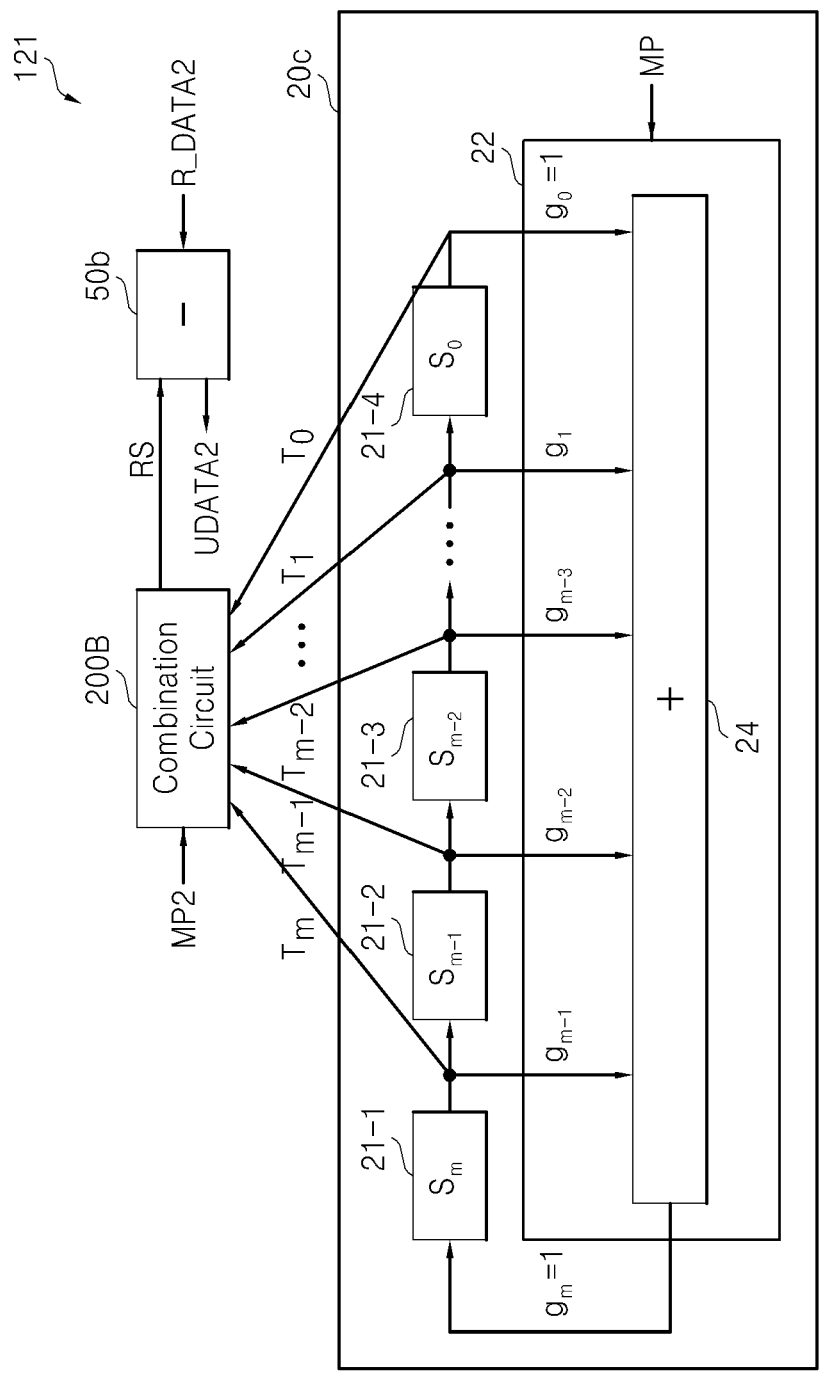
FIG. 9 illustrates another example embodiment of the de-randomizer including the pseudo random number generator illustrated in FIG. 5.

FIG. 9 illustrates another example embodiment of the de-randomizer including the pseudo random number generator illustrated in FIG. 5. The conversion circuit 50b generates data UDATA2 by performing modulo subtraction of a pseudo random number sequence RS from randomized data R_DATA2. Otherwise, a structure of the de-randomizer 120 of FIG. 8 is substantially the same as a structure of a de-randomizer 121 illustrated in FIG. 9.

A conversion circuit 50b which may perform modulo-subtraction de-randomizes randomized data R_DATA2 to data UDATA2 based on a pseudo random number sequence RS output from the combination circuit 200B.

Figure 10:
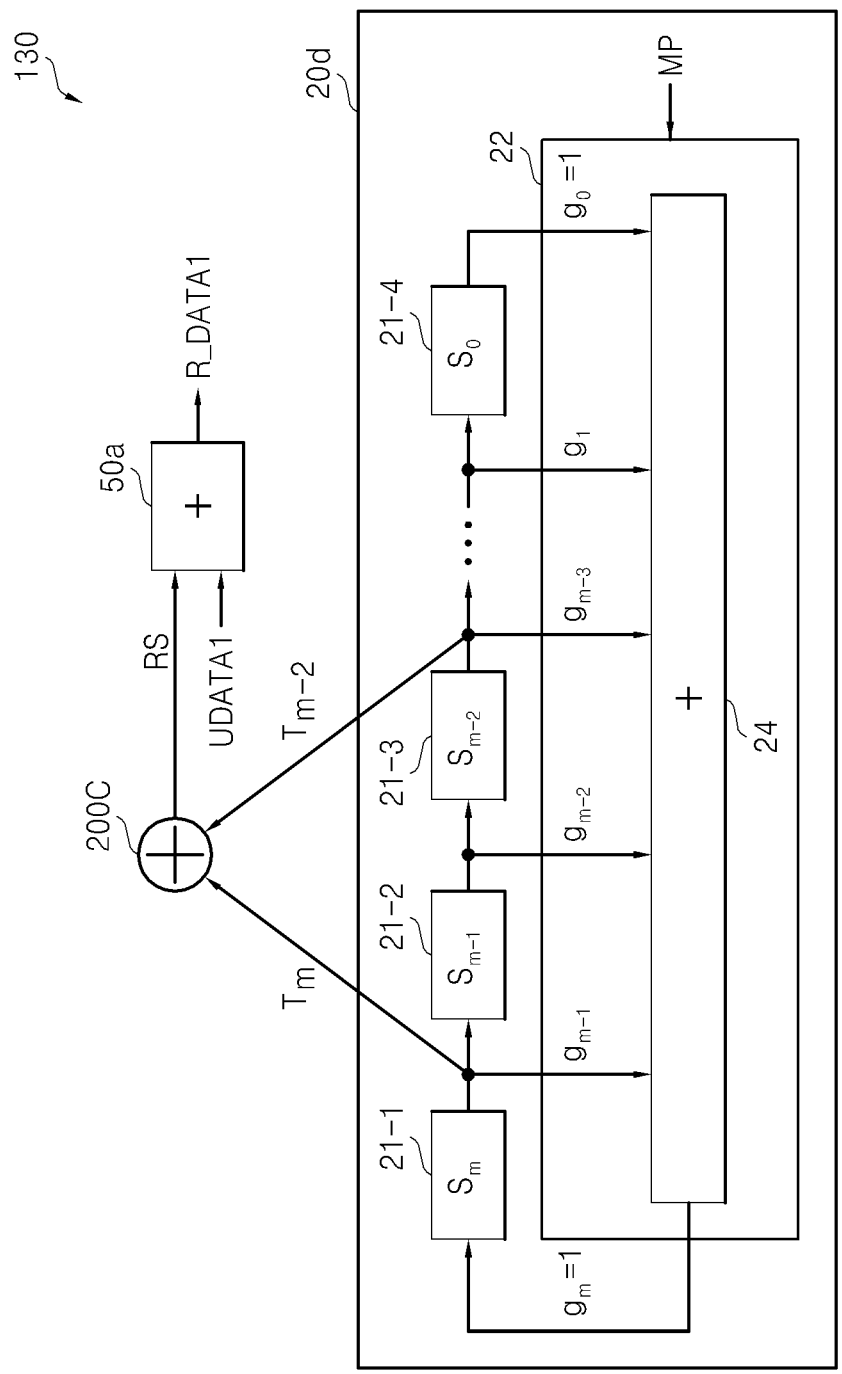
FIG. 10 illustrates still another example embodiment of the randomizer including the pseudo random number generator illustrated in FIG. 5.

FIG. 10 illustrates still another example embodiment of the randomizer including the pseudo random number generator illustrated in FIG. 5. Referring to FIG. 10, a randomizer 130 includes a pseudo random number generator 20d according to still another example embodiment of the pseudo random number generator illustrated in FIG. 5, a Boolean logic gate 200C embodied as still another example of the combination circuit 200 illustrated in FIG. 5, and the conversion circuit 50a. For convenience of explanation, a XOR gate is illustrated exemplarily as the Boolean logic gate 200C in FIG. 10. According to an example embodiment, the Boolean logic gate 200C may be replaced with other combination circuits which may perform modulo-P addition or modulo-P multiplication.

The Boolean logic gate 200C outputs a pseudo random number sequence RS as a combination result after performing a Boolean logic combination on output signals of two shift registers 21-1 and 21-3 among a plurality of shift registers 21-1 to 21-4 included in a pseudo random number generator 20d.

The conversion circuit 50a which may perform modulo addition randomizes data UDATA1 to data R_DATA1 by using a pseudo random number sequence RS output from the Boolean logic gate 200C.

Figure 11:
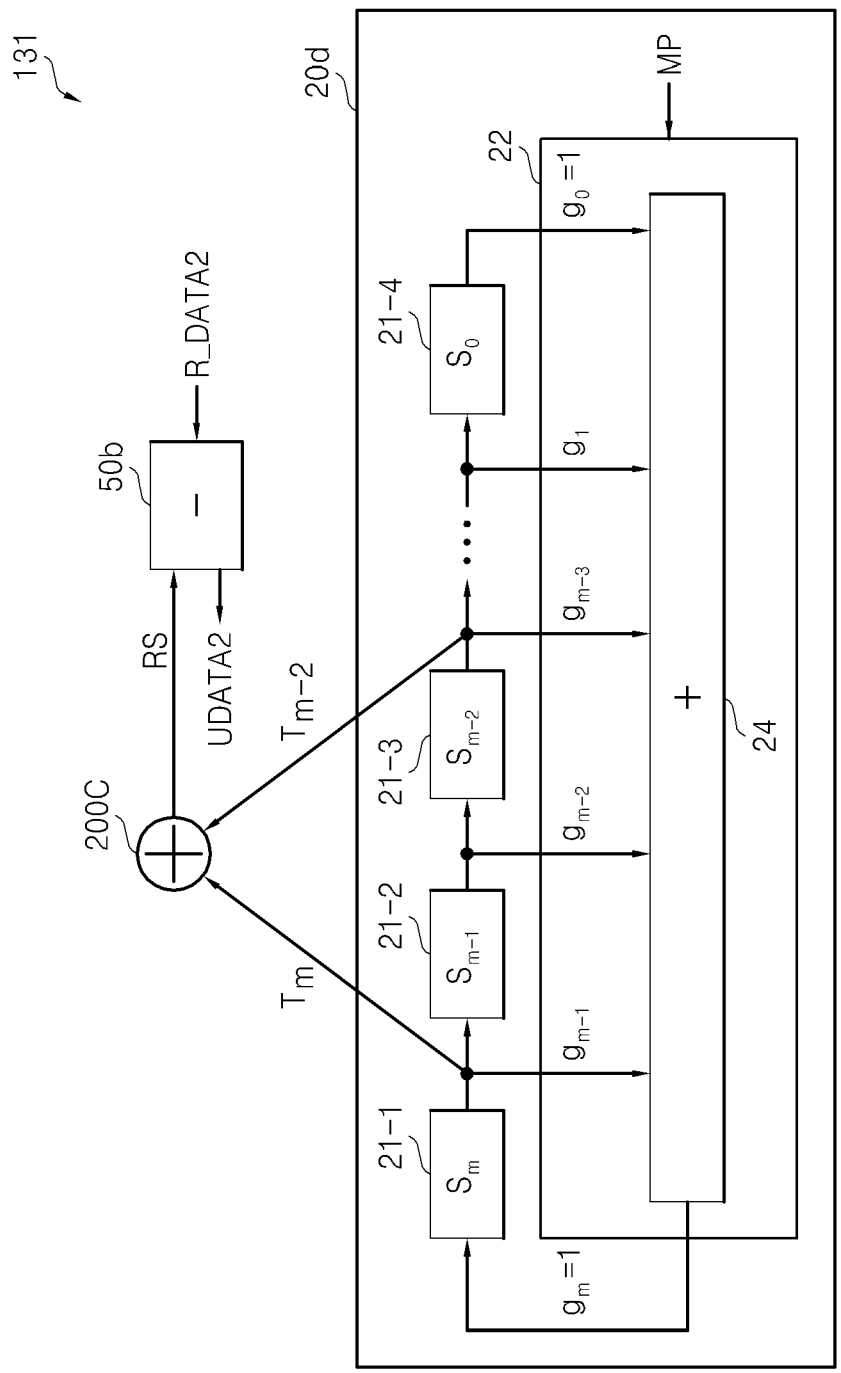
FIG. 11 illustrates still another example embodiment of the de-randomizer including the pseudo random number generator illustrated in FIG. 5.

FIG. 11 illustrates still another example embodiment of the de-randomizer including the pseudo random number generator illustrated in FIG. 5. A conversion circuit 50b generates a data UDATA2 by performing modulo subtraction of a pseudo random number sequence RS from randomized data R_DATA2. Otherwise, a structure of the randomizer 130 illustrated in FIG. 10 is substantially the same as a structure of de-randomizer 131 illustrated in FIG. 11.

The conversion circuit 50b de-randomizes randomized data R_DATA2 to data UDATA2 based on a pseudo random number sequence RS output from the Boolean logic gate 200C.

Figure 12:
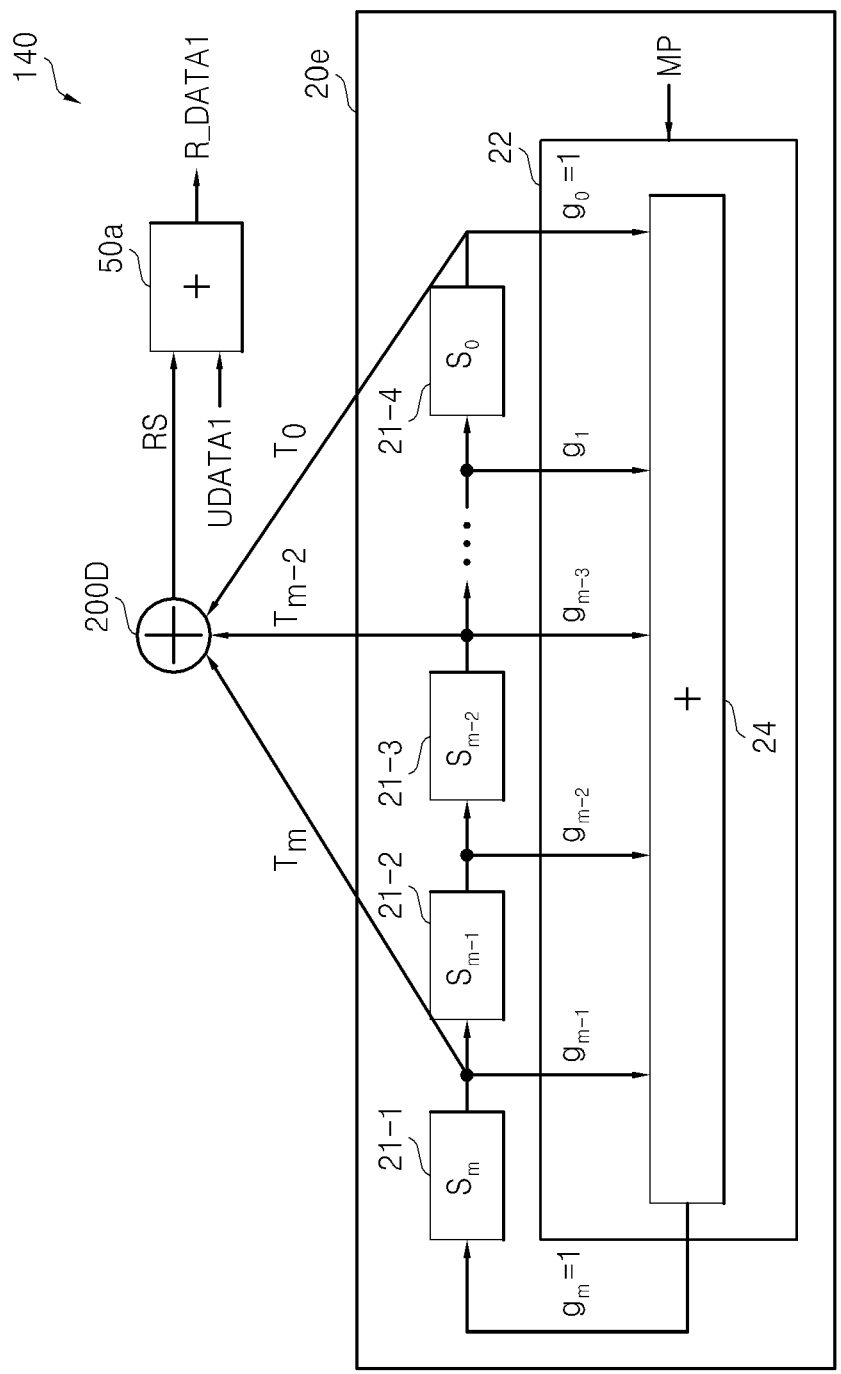
FIG. 12 illustrates still another example embodiment of the randomizer including the pseudo random number generator illustrated in FIG. 5.

FIG. 12 illustrates still another example embodiment of the randomizer including the pseudo random number generator illustrated in FIG. 5. Referring to FIG. 12, a randomizer 140 includes a pseudo random number generator 20e which is still another example embodiment of the pseudo random number generator 20 of FIG. 5, a Boolean logic gate 200D which is embodied as still another example of the combination circuit 200 of FIG. 5, and the conversion circuit 50a. For convenience of explanation, FIG. 12 illustrates an XOR gate exemplarily as the Boolean logic gate 200D. According to an example embodiment, the Boolean logic gate 200D may be replaced with other combination circuits which may perform modulo-P addition or modulo-P multiplication.

The Boolean logic gate 200D outputs a pseudo random number sequence RS as a combination result by performing a Boolean logic combination on output signals of three shift registers 21-1, 21-3 and 21-4 among a plurality of shift registers 21-1 to 21-4 included in the pseudo random number generator 20e.

The conversion circuit 50a randomizes data UDATA1 to data R_DATA1 based on a pseudo random number sequence RS output from the Boolean logic gate 200D.

Figure 13:
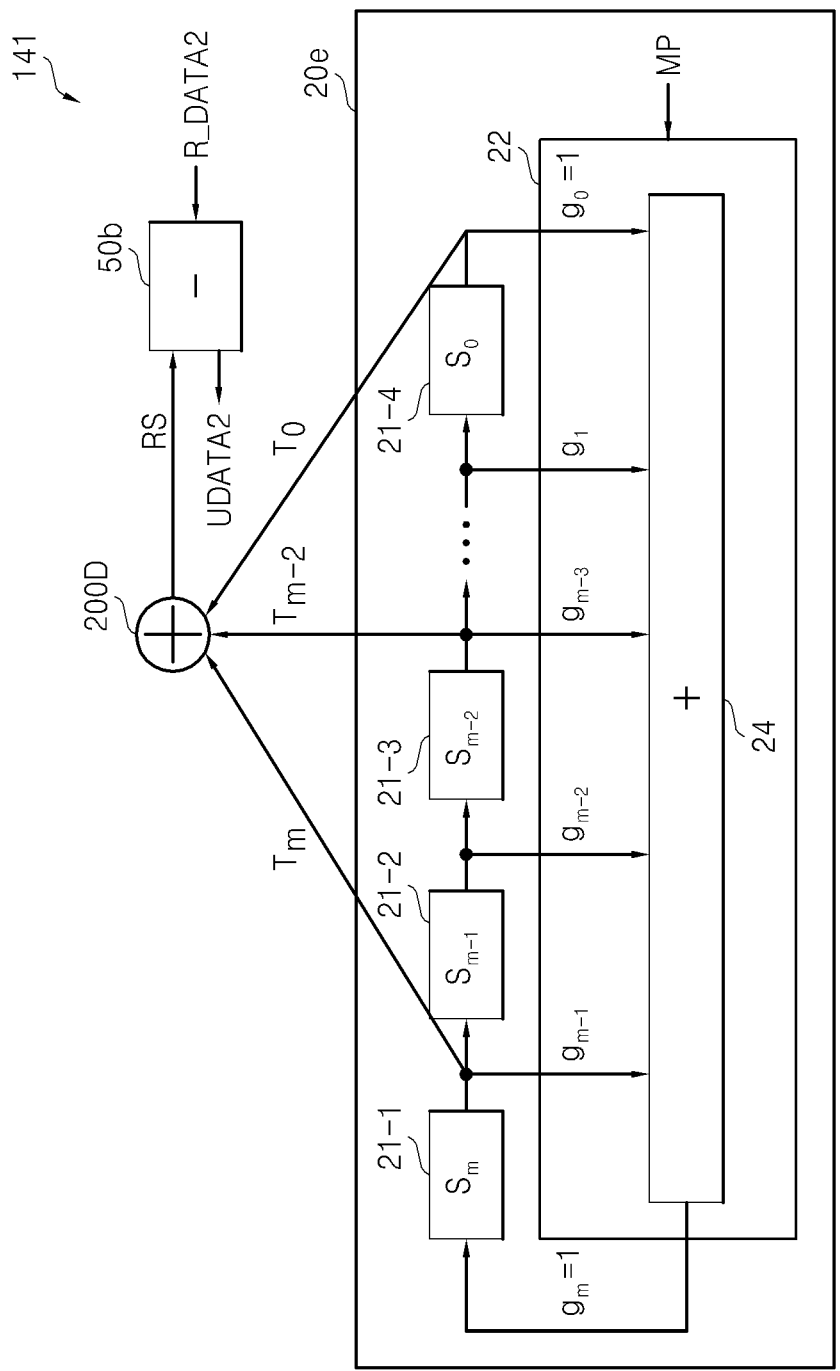
FIG. 13 illustrates still another example embodiment of the de-randomizer including the pseudo random number generator illustrated in FIG. 5.

FIG. 13 illustrates still another example embodiment of the de-randomizer including the pseudo random number generator illustrated in FIG. 5. A conversion circuit 50b generates data UDATA2 by performing modulo-subtraction of a pseudo random number sequence RS from randomized data R_DATA2. Otherwise, the randomizer 140 illustrated in FIG. 12 has substantially the same structure as a de-randomizer 141 illustrated in FIG. 13.

The conversion circuit 50b de-randomizes randomized data R_DATA2 to data UDATA2 based on a pseudo random sequence RS output from the Boolean logic gate 200D.

Figure 14:
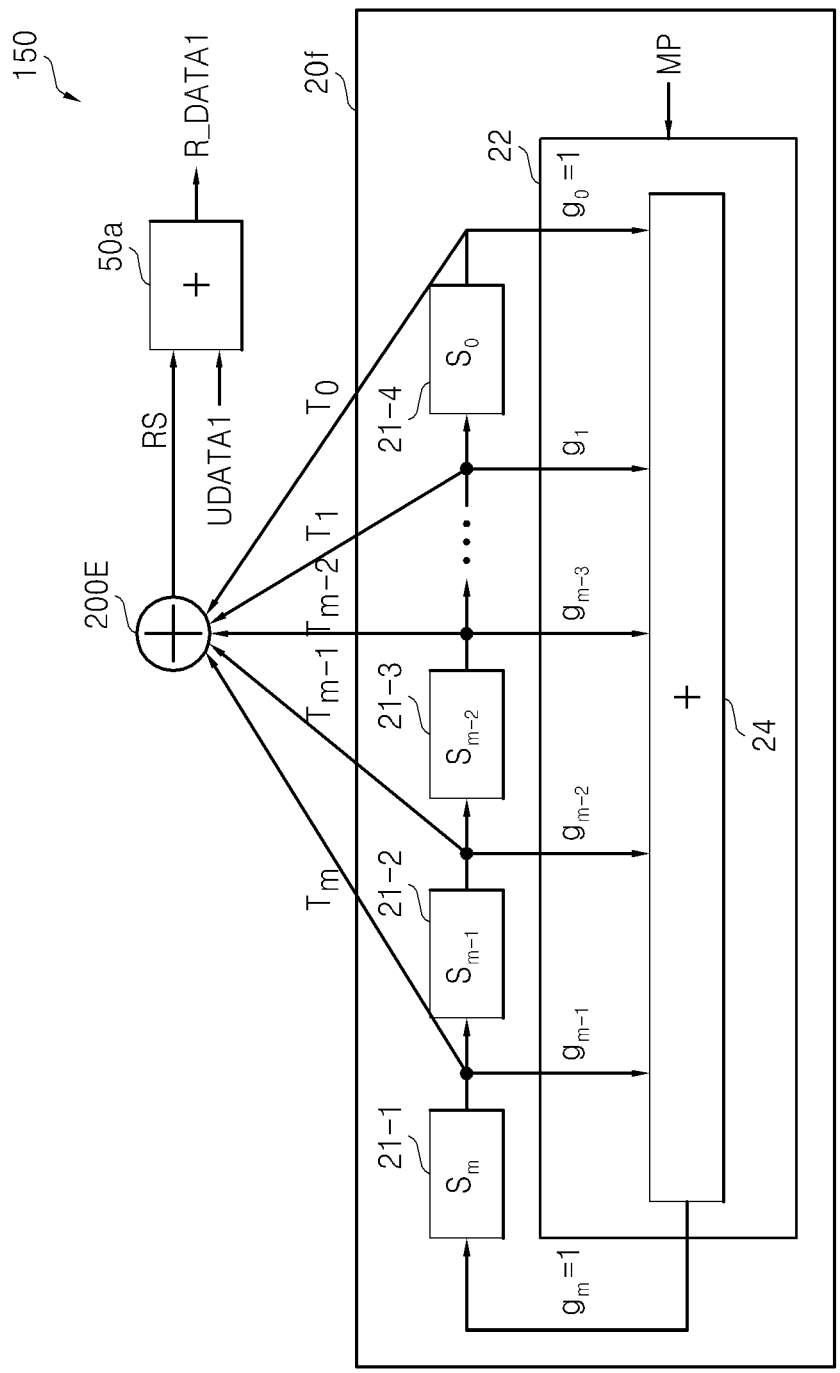
FIG. 14 illustrates still another example embodiment of the randomizer including the pseudo random number generator illustrated in FIG. 5.

FIG. 14 illustrates still another example embodiment of the randomizer including the pseudo random number generator illustrated in FIG. 5. Referring to FIG. 14, a randomizer 150 includes a pseudo random number generator 20f which is still another example embodiment of the pseudo random number generator 20 of FIG. 5, a Boolean logic gate 200E which is embodied as still another example of the combination circuit 200 of FIG. 5, and the conversion circuit 50a. For convenience of explanation, an XOR gate is illustrated exemplarily as the Boolean logic gate 200E in FIG. 14. According to an example embodiment, the Boolean logic gate 200E may be replaced with other combination circuits which may perform modulo-P addition or modulo-P multiplication.

The Boolean logic gate 200E outputs a pseudo random number sequence RS as a combination result by performing a Boolean logic combination on output signals of all of the plurality of shift registers 21-1 to 21-4 included in the pseudo random number generator 20f.

The conversion circuit 50a randomizes data UDATA1 to data R_DATA1 based on a pseudo random number sequence RS output from the Boolean logic gate 200E.

Figure 15:
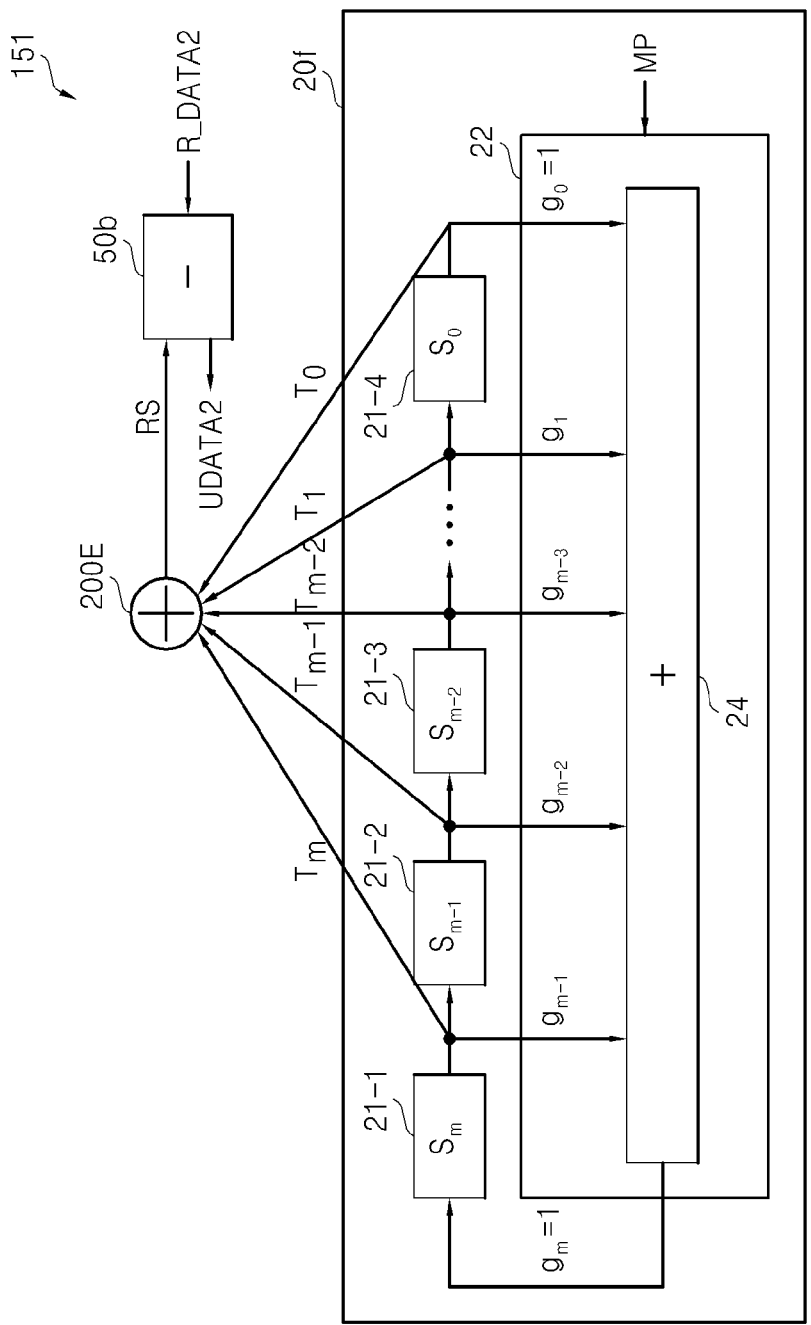
FIG. 15 illustrates still another example embodiment of the de-randomizer including the pseudo random number generator illustrated in FIG. 5.

FIG. 15 illustrates still another example embodiment of the de-randomizer including the pseudo random number generator illustrated in FIG. 5. A conversion circuit 50b generates data UDATA2 by performing modulo-subtraction of a pseudo random number sequence RS from randomized data R_DATA2. Otherwise, the randomizer 150 illustrated in FIG. 14 has substantially the same structure as a de-randomizer 151 illustrated in FIG. 15.

The conversion circuit 50b de-randomizes randomized data R_DATA2 to a data UDATA2 based on a pseudo random sequence RS output from the Boolean logic gate 200E.

FIG. 16A illustrates an example embodiment in which a pseudo random number generator and a conversion circuit according to an example embodiment of the inventive concepts is embodied in a data processing device. A data processing device 300 which may be embodied in a chip includes a pseudo random number generator 20, a conversion circuit 50c and a memory 310. The pseudo random number generator 20 may be embodied in one of the said pseudo random number generators 20a, 20b, 20c, 20d, 20e and 20f.

During a write or a program operation, a conversion circuit 50c may randomize data UDATAi, where i is 1, to data R_DATAi, where i is 1, based on a pseudo random number sequence RS output from the pseudo random number generator 20, and randomized second data R_DATAi may be written or programmed in a memory 310 through a write circuit (not shown).

During a read operation, the conversion circuit 50c may de-randomize randomized data R_DATAi, where i is 2, read from the memory 310 to data UDATAi, where i is 2, based on a pseudo random number sequence RS output from the pseudo random number generator 20.

Figure 16B:
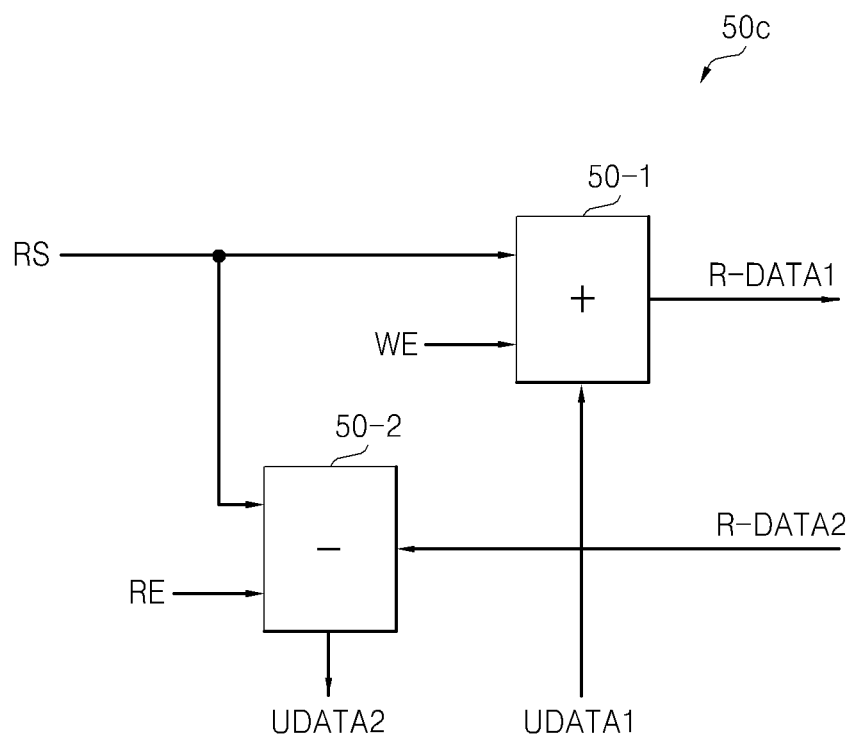
FIG. 16B is a block diagram illustrating an example embodiment of the conversion circuit illustrated in FIG. 16A.

FIG. 16B is a block diagram illustrating an example embodiment of the conversion circuit illustrated in FIG. 16A.

Referring to FIGS. 16A and 16B, the conversion circuit 50c sharing one pseudo random number generator 20 includes a first conversion circuit 50-1 and a second conversion circuit 50-2.

During a write operation, the first conversion circuit 50-1, which may be enabled based on a write enable signal WE having a high level, may randomize data UDATA1 to data R_DATA1 by using a pseudo random number sequence RS. During a read operation, the second conversion circuit 50-2, which may be enabled based on a read enable signal RE having a high level, may de-randomize randomized data R_DATA2 to data UDATA2 by using a pseudo random number sequence RS.

If a time point when a write enable signal WE is changed to a high level and a time point when a read enable signal RE is changed to a high level are properly controlled, the write operation and the read operation may be performed at different time points or at the same time.

The first conversion circuit 50-1 may be embodied in a conversion circuit 50a which may perform modulo addition, and the second conversion circuit 50-2 may be embodied in a conversion circuit 50b which may perform modulo subtraction.

Figure 17:
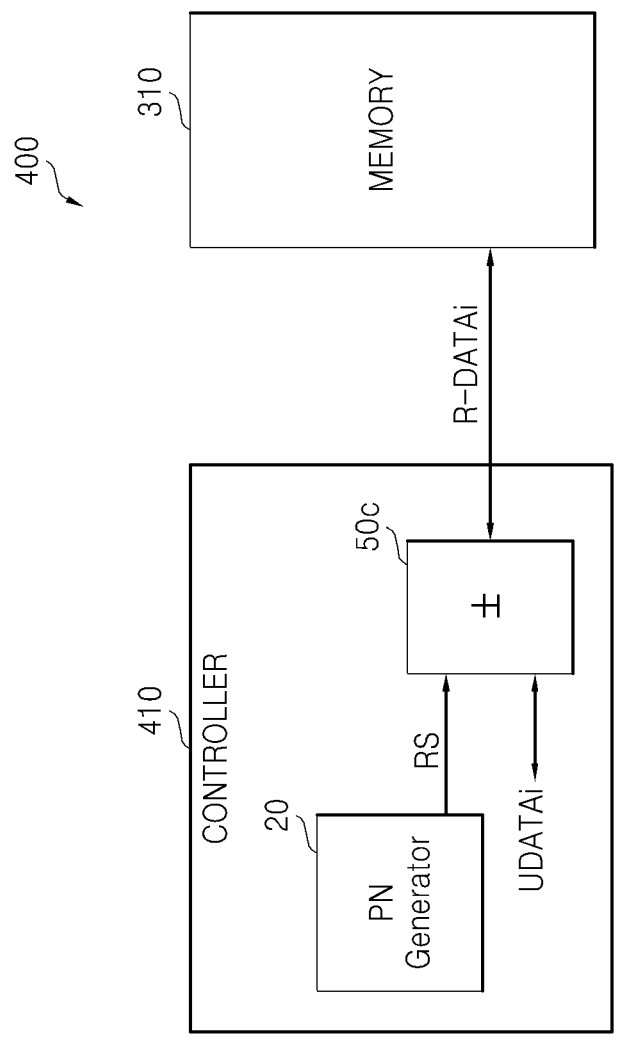
FIG. 17 illustrates another example embodiment in which a pseudo random number generator and a conversion circuit according to an example embodiment of the inventive concepts are embodied in a data processing device.

FIG. 17 illustrates another example embodiment in which the pseudo random number generator and the conversion circuit according to an example embodiment of the inventive concepts are embodied in the data processing device.

A data processing device 400 includes a memory 310 and a controller 410 which may control an operation of the memory 310. The pseudo random number generator 20 and a conversion circuit 50c are integrated on the controller 410 embodied in a separate chip from a chip where the memory 310 is integrated.

During a write or a program operation, the conversion circuit 50c randomizes data UDATAi, where i is 1, to data R_DATAi, where i is 1, by using a pseudo random number sequence RS and transmits randomized data R_DATAi, where i is 1, to a memory 310 through a data bus. During a read operation, the conversion circuit 50c may de-randomize randomized data R_DATAi, where i is 2, read from the memory 310 to data UDATAi, where i is 2, by using the pseudo random number sequence RS.

Figure 18:
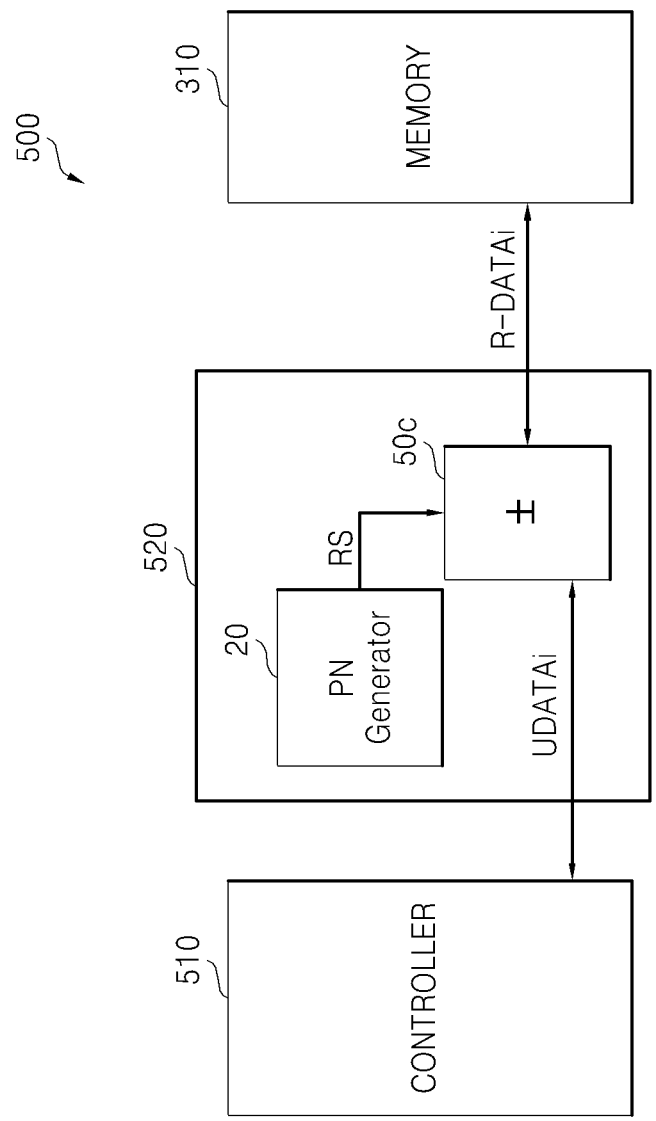
FIG. 18 illustrates still another example embodiment in which a pseudo random number generator and a conversion circuit according to an example embodiment of the inventive concepts are embodied in a data processing device.

FIG. 18 illustrates still another example embodiment in which the pseudo random number generator and the conversion circuit according to an example embodiment of the inventive concepts are embodied in the data processing device. A data processing device 500 includes the memory 310, a controller 510 which may control an operation of the memory 310, and a randomizer/de-randomizer 520.

The randomizer/de-randomizer 520 including the pseudo random number generator 20 and the conversion circuit 50c may be embodied between the memory 310 and the controller 510. Here, the randomizer/de-randomizer 520 may be embodied in a separate chip.

Accordingly, during a write or a program operation, the conversion circuit 50c may randomize data UDATA output from the controller 510 by using the pseudo random number sequence RS output from the pseudo random number generator 20 and transmit randomized data R_DATAi to the memory 310.

During a read operation, the conversion circuit 50c may de-randomize the randomized data R_DATAi output from the memory 310 by using a pseudo random number sequence RS output from the pseudo random number generator 20, and transmit de-randomized data UDATAi to the controller 510.

Figure 19:
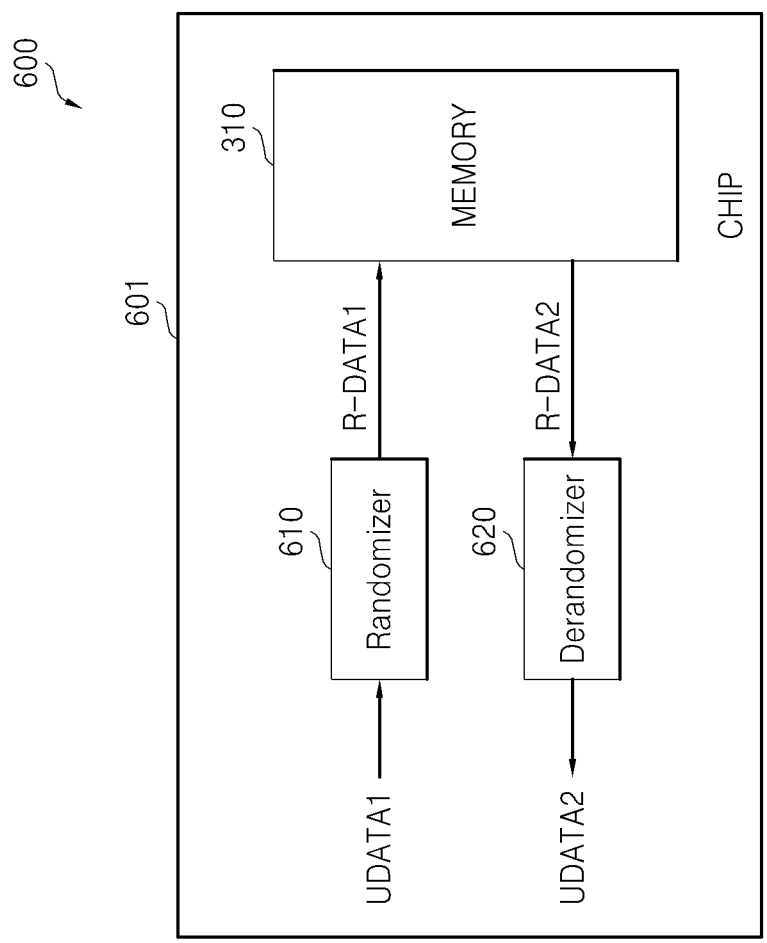
FIG. 19 illustrates an example embodiment in which a randomizer and a de-randomizer according to an example embodiment of the inventive concepts are embodied in a data processing device.
Figure 20:
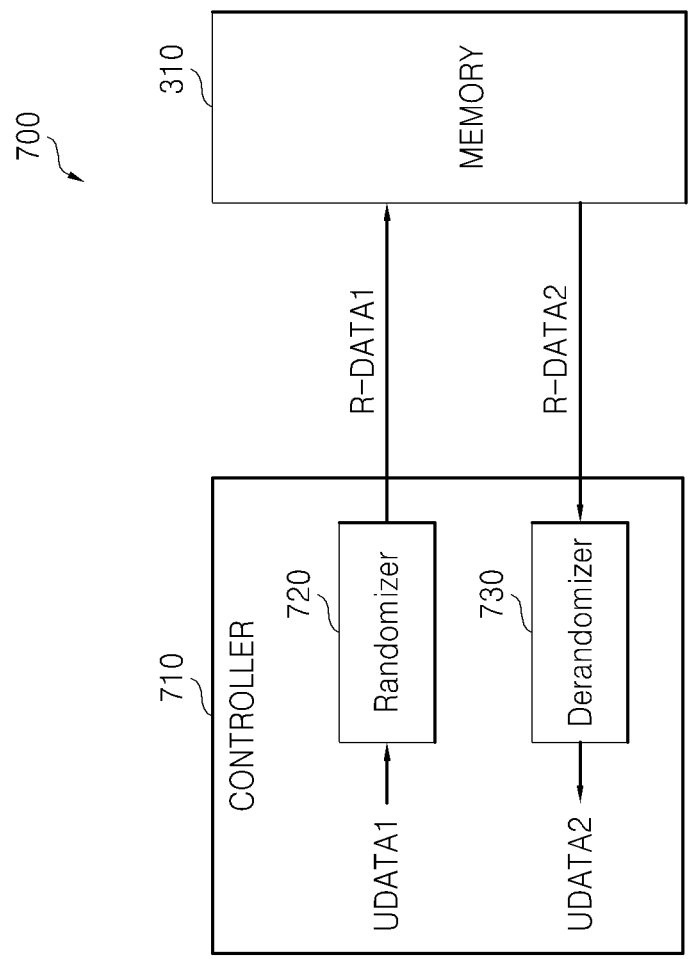
FIG. 20 illustrates another example embodiment in which a randomizer and a de-randomizer according to an example embodiment of the inventive concepts are embodied in the data processing device.
Figure 21:
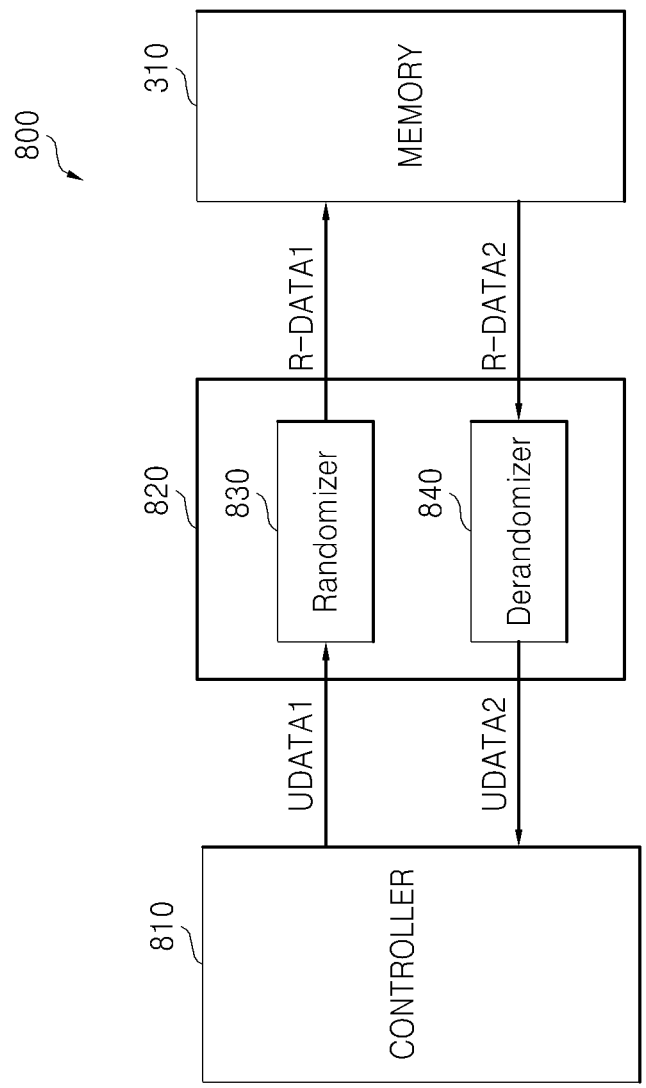
FIG. 21 illustrates still another example embodiment in which a randomizer and a de-randomizer according to an example embodiment of the inventive concepts are embodied in the data processing device.

Each data processing device 600, 700 and 800 illustrated in FIGS. 19, 20 and 21 has a structure which may perform a write or a program operation and a read operation at the same time.

FIG. 19 illustrates an example embodiment where a randomizer and a de-randomizer according to an example embodiment of the inventive concepts are embodied in a data processing device. The memory 310, a randomizer 610 and a de-randomizer 620 may be integrated on a chip 601. During a write or a program operation, the randomizer 610 which may be embodied in one of a plurality of randomizers 100, 110, 120, 130, 140 and 150 randomizes data UDATA1 to data R_DATA1 based on a pseudo random number sequence RS output from each component 20a, 200A, 200B, 200C, 200D or 200E and transmits randomized second data R_DATA1 to the memory 310.

Simultaneously, the de-randomizer 620 which may be embodied in one of a plurality of de-randomizers 101, 111, 121, 131, 141 and 151 de-randomizes randomized data R_DATA2 output from the memory 310 to data UDATA2 based on the pseudo random number sequence RS output from each component 20a, 200A, 200B, 200C, 200D or 200E during a read operation.

FIG. 20 illustrates another example embodiment where the randomizer and the de-randomizer according to an example embodiment of the inventive concepts are embodied in the data processing device.

A data processing device 700 includes the memory 310 and a controller 710 which may control an operation of the memory 310. A randomizer 720 and a de-randomizer 730 are integrated on the controller 710.

During a write or a program operation, a randomizer 720 which may be embodied in one of the plurality of randomizers 100, 110, 120, 130, 140 and 150 randomizes data UDATA1 to data R_DATA1 based on the pseudo random number sequence RS output from each component 20a, 200A, 200B, 200C, 200D or 200E, and transmits randomized data R_DATA1 to the memory 310.

At the same time, the de-randomizer 730 which may be embodied in one of the plurality of de-randomizers 101, 111, 121, 131, 141 and 151 de-randomizes randomized data R_DATA2 output from the memory 310 to data UDATA2 based on the pseudo random number sequence RS output from each component 20a, 200A, 200B, 200C, 200D or 200E during a read operation.

FIG. 21 illustrates still another example embodiment wherein the randomizer and the de-randomizer according to an example embodiment of the inventive concepts are embodied in the data processing device.

A data processing device 800 includes the memory 310, a controller 810 which may control an operation of the memory 310, and a randomizer/de-randomizer 820. The randomizer/de-randomizer 820 is embodied between the memory 310 and the controller 810.

During a write or a program operation, the randomizer 830 which may be embodied in one of the plurality of randomizers 100, 110, 120, 130, 140 and 150 randomizes data UDATA1 output from the controller 810 to data R_DATA1 and transmits randomized data R_DATA1 to the memory 310 based on the pseudo random number sequence RS output from each component 20a, 200A, 200B, 200C, 200D or 200E.

At the same time, a de-randomizer 840 which may be embodied in one of the plurality of de-randomizers 101, 111, 121, 131, 141 and 151 de-randomizes randomized data R_DATA2 output from the memory 310 to data UDATA2 based on the pseudo random number sequence output from each component 20a, 200A, 200B, 200C, 200D or 200E and outputs de-randomized data UDATA2 to the controller 810 during a read operation.

Figure 22:
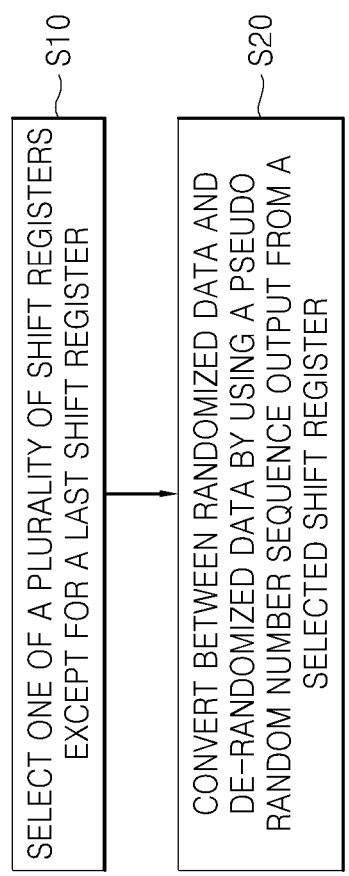
FIG. 22 is a flowchart for use in describing a method of operating a data processing device according to an example embodiment of the inventive concepts.

FIG. 22 is a flowchart illustrating an operational method of a data processing device according to an example embodiment of the inventive concepts. Referring to FIGS. 1, 2, 4, 6, 7 and 22, the pseudo random number generator 20 generates a pseudo random number sequence RS by using one of the plurality of shift registers 21-1 to 21-4 excluding last shift register 21-4 (S10).

During a program operation, a conversion circuit 50a randomizes data UDATA1 to data R_DATA1 by using a pseudo random number sequence RS. During a read operation, a conversion circuit 50b de-randomizes randomized data R_UDATA2 to data UDATA2 based on a pseudo random number sequence RS (S20).

FIG. 23 is a flowchart illustrating an operational method of the data processing device according to another example embodiment of the inventive concepts. Referring to FIGS. 5, 8 to 15 and 23, each combination circuit 200A, 200B, 200C, 200D and 200E generates a pseudo random number sequence RS by using a selection operation selecting output signals of at least two of a plurality of shift registers 21-1 to 21-4 included in a pseudo random number generator 20b, 20c, 20d, 20e or 20f and/or a combination method of output signals of the at least two shift registers (S110).

During a program operation, a conversion circuit 50a randomizes data UDATA1 to data R_DATA1 and transmits it to the memory 310 by using a pseudo random number sequence RS. During a read operation, a conversion circuit 50b de-randomizes randomized data R_UDATA2 to data UDATA2 by using a pseudo random number sequence RS (S120).

According to an example embodiment, a parameter used for a write or a program operation and a parameter used for a read operation may be the same parameter or different parameters.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A data processing device comprising:
   a single pseudo random number generator including a series connection of plural shift registers;
   a polynomial coefficient controller configured to generate a memory parameter MP referring to data stored in a table and transmit the memory parameter MP for determining a feedback polynomial of the single pseudo random number generator to the single pseudo random number generator;
   a selector configured to receive an output from each of the plural shift registers, and to select an output from one of the plural shift registers excluding a last shift register of the series connection as a pseudo random number sequence; and
   a conversion circuit which receives the pseudo random number sequence from the selector, and which converts first data to second data using the received pseudo random number sequence,
   wherein the selector is configured to select the output from the one of the plural shift registers responsive to the memory parameter MP, and wherein the memory parameter MP comprises a memory access parameter of the first or second data, and
   wherein the memory parameter MP is configured for accessing a flash memory including a block including a plurality of pages, and wherein the memory access parameter is at least one of a block address, a page address, a word line address, a bit line address, a chip identification (ID) of the flash memory, a program count and an erase count.

2. The device of claim 1, wherein the single pseudo random number generator comprises a feedback polynomial determination circuit which determines the feedback polynomial of the single pseudo random number generator in accordance with the memory parameter MP.

3. The device of claim 2, wherein the conversion includes randomizing the first data to obtain the second data which is randomized, and the conversion circuit is configured to execute a modulo addition operation on the first data and the pseudo random number sequence.

4. The device of claim 2, wherein the conversion includes de-randomizing the first data to obtain the second data which is de-randomized, and the conversion circuit is configured to execute a modulo subtraction operation on the first data and the pseudo random number sequence.

5. The device of claim 2, wherein the memory access parameter is a word line address or a bit line address.

6. The device of claim 2, wherein the single pseudo random number generator is one of a Fibonacci linear feedback pseudo random number generator, a Galois linear feedback pseudo random number generator, a Fibonacci non-linear feedback pseudo random number generator and a Galois non-linear feedback pseudo random number generator.

7. The device of claim 1, wherein the single pseudo random number generator comprises a logic gate array including a plurality of Boolean logic gates and determines a logic output corresponding to the pseudo random number sequence in accordance with the memory parameter MP.

8. A data processing device comprising:
a single pseudo random number generator including a series connection of plural shift registers;
a polynomial coefficient controller configured to generate a memory parameter MP referring to data stored in a table and transmit the memory parameter MP for determining a feedback polynomial of the single pseudo random number generator to the single pseudo random number generator;
a selector configured to receive an output from each of the plural shift registers, and to select an output from one of the plural shift registers excluding a last shift register of the series connection as a pseudo random number sequence;
a combination circuit configured to connect at least two output terminals of at least two shift registers among the plural shift registers connected in series, to combine output signals of the at least two shift registers and to generate a pseudo random number sequence; and
a conversion circuit connected to the combination circuit, which receives the pseudo random number sequence output from the combination circuit, and which converts first data to second data using the received random number sequence,
wherein the selector is configured to select the output from the one of the plural shift registers responsive to the memory parameter MP, and wherein the memory parameter MP comprises a memory access parameter of the first or second data, and
wherein the memory parameter MP is configured for accessing a flash memory including a block including a plurality of pages, and wherein the memory access parameter is at least one of a block address, a page address, a word line address, a bit line address, a chip identification (ID) of the flash memory, a program count and an erase count.

9. The device of claim 8, wherein the single pseudo random number generator comprises a feedback polynomial determination circuit which determines a feedback polynomial of the pseudo random number generator in accordance with the memory access parameter of the first or second data.

10. The device of claim 9, wherein the conversion includes randomizing the first data to obtain the second data which is randomized, and the conversion circuit is configured to execute a modulo addition operation on the first data and the pseudo random number sequence.

11. The device of claim 9, wherein the conversion includes de-randomizing the first data to obtain the second data which is de-randomized, and the conversion circuit is configured to execute a modulo subtraction operation on the first data and the pseudo random number sequence.

12. The device of claim 9, wherein the memory access parameter is a word line address or a bit line address.

13. The device of claim 8, wherein the pseudo random number generator comprises a logic gate array including a plurality of Boolean logic gates and determines a logic output corresponding to the pseudo random number sequence in accordance with the memory access parameter of the first or second data.

14. The device of claim 8, wherein the combination circuit selectively combines output signals of the at least two shift registers among the plural shift registers in accordance with the memory access parameter of the first or second data.

15. The device of claim 8, wherein the combination circuit is configured to selectively execute at least one of first and second operations for combining the output signals of the at least two shift registers in accordance with the memory access parameter of the first or second data,
wherein the first and second operations are modulo-P addition and modulo-P multiplication, respectively, where P is a natural number of more than 2.

16. A method for operating a data processing device, the method comprising:
providing a single pseudo random number generator including a series connection of plural shift registers;
generating a memory parameter MP referring to data stored in a table;
transmitting the memory parameter MP for determining a feedback polynomial of the single pseudo random number generator to the single pseudo random number generator;
generating a pseudo random number sequence using the series connection of the plural shift registers,
said generating comprising selecting an output from one of the plural shift registers excluding a last shift register of the series connection as the pseudo random number sequence; and
converting first data to second data using the pseudo random number sequence,
wherein said selecting is responsive to the memory parameter MP and wherein the memory parameter MP corresponds to the first or second data,
wherein the memory parameter MP comprises a memory access parameter of the first or second data, and
wherein the memory parameter MP is configured for accessing a flash memory including a block including a plurality of pages, and wherein the memory access parameter is at least one of a block address, a page address, a word line address, a bit line address, a chip identification (ID) of the flash memory, a program count and an erase count.

17. The method of claim 16, further comprising determining a feedback polynomial of the single pseudo random number generator in accordance with the memory parameter MP.

18. The method of claim 17, wherein the converting includes randomizing the first data to obtain the second data which is randomized.

19. The method of claim 17, wherein the converting includes de-randomizing the first data to obtain the second data which is de-randomized.

20. A data processing device comprising:
a memory;
a single pseudo random number generator including a series connection of plural shift registers;
a polynomial coefficient controller configured to generate a memory parameter MP referring to data stored in a table and transmit the memory parameter MP for determining a feedback polynomial of the single pseudo random number generator to the single pseudo random number generator;
a selector configured to receive an output from each of the plural shift registers, and to select an output from one of the plural shift registers excluding a last shift register of the series connection as a pseudo random number sequence;
a randomizer which randomizes first data to obtain random second data for storage in the memory, the randomizer randomizing the first data using the pseudo random number sequence; and
a de-randomizer which de-randomizes third data read from the memory to obtain de-randomized fourth data using the pseudo random number sequence, wherein the selector is configured to select the output from the one of the plural shift registers responsive to the memory parameter MP, and wherein the memory parameter MP comprises a memory access parameter of the second or third data, and wherein the memory parameter MP is configured for accessing a flash memory including a block including a plurality of pages, and wherein the memory access parameter is at least one of a block address, a page address, a word line address, a bit line address, a chip identification (ID) of the flash memory, a program count and an erase count.

21. The device of claim 20, wherein the single pseudo random number generator comprises a feedback polynomial determination circuit determining the feedback polynomial in accordance with the memory parameter MP, and wherein the memory parameter MP comprises respective memory access parameters of the second and third data.

* * * * *